(12) United States Patent
Koizumi et al.

(10) Patent No.: US 8,896,947 B2
(45) Date of Patent: Nov. 25, 2014

(54) DISK STORAGE APPARATUS AND METHOD FOR DETERMINING MALFUNCTION OF HIGH-FREQUENCY OSCILLATING ELEMENT

(71) Applicant: Kabushiki Kaisha Toshiba, Tokyo (JP)

(72) Inventors: Gaku Koizumi, Yokohama (JP); Masahiro Takashita, Kawasaki (JP); Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/899,987

(22) Filed: May 22, 2013

(65) Prior Publication Data

US 2014/0168808 A1    Jun. 19, 2014

(30) Foreign Application Priority Data

Dec. 18, 2012   (JP) .................................. 2012-276052

(51) Int. Cl.
*G11B 27/36*    (2006.01)
*G11B 5/02*     (2006.01)
*G11B 5/455*    (2006.01)

(52) U.S. Cl.
CPC ..................................... *G11B 5/455* (2013.01)
USPC .............................................. 360/31; 360/59

(58) Field of Classification Search
CPC ............................................. G11B 2005/0024
See application file for complete search history.

(56) References Cited

U.S. PATENT DOCUMENTS 8,358,127 B2 *   1/2013   Sato et al. ...................... 324/250
2013/0050865 A1 *   2/2013   Katada et al. .................... 360/31

FOREIGN PATENT DOCUMENTS

| JP | 3366172 B | 11/2002 |
| JP | 2005-092988 A | 4/2005 |
| JP | 2007-004857 A | 1/2007 |
| JP | 4823391 B | 9/2011 |

* cited by examiner

*Primary Examiner* — Daniell L Negron
(74) *Attorney, Agent, or Firm* — Knobbe Martens Olson & Bear LLP

(57) ABSTRACT

According to one embodiment, a disk storage apparatus includes a magnetic head, a detector, a calculator, and a decision module. The magnetic head has a high-frequency assisted element disposed close to a main magnetic pole that generates a recording magnetic field for perpendicular magnetic recording, the high-frequency assisted element applying a high-frequency magnetic field onto a magnetic disk during data recording. The detector detects an electrical resistance of the high-frequency assisted element. The calculator calculates time axis data indicative of a variation, on a time axis, in the electrical resistance value detected by the detector. The decision module determines whether the high-frequency assisted elements is malfunctioning based on the time axis data.

20 Claims, 35 Drawing Sheets

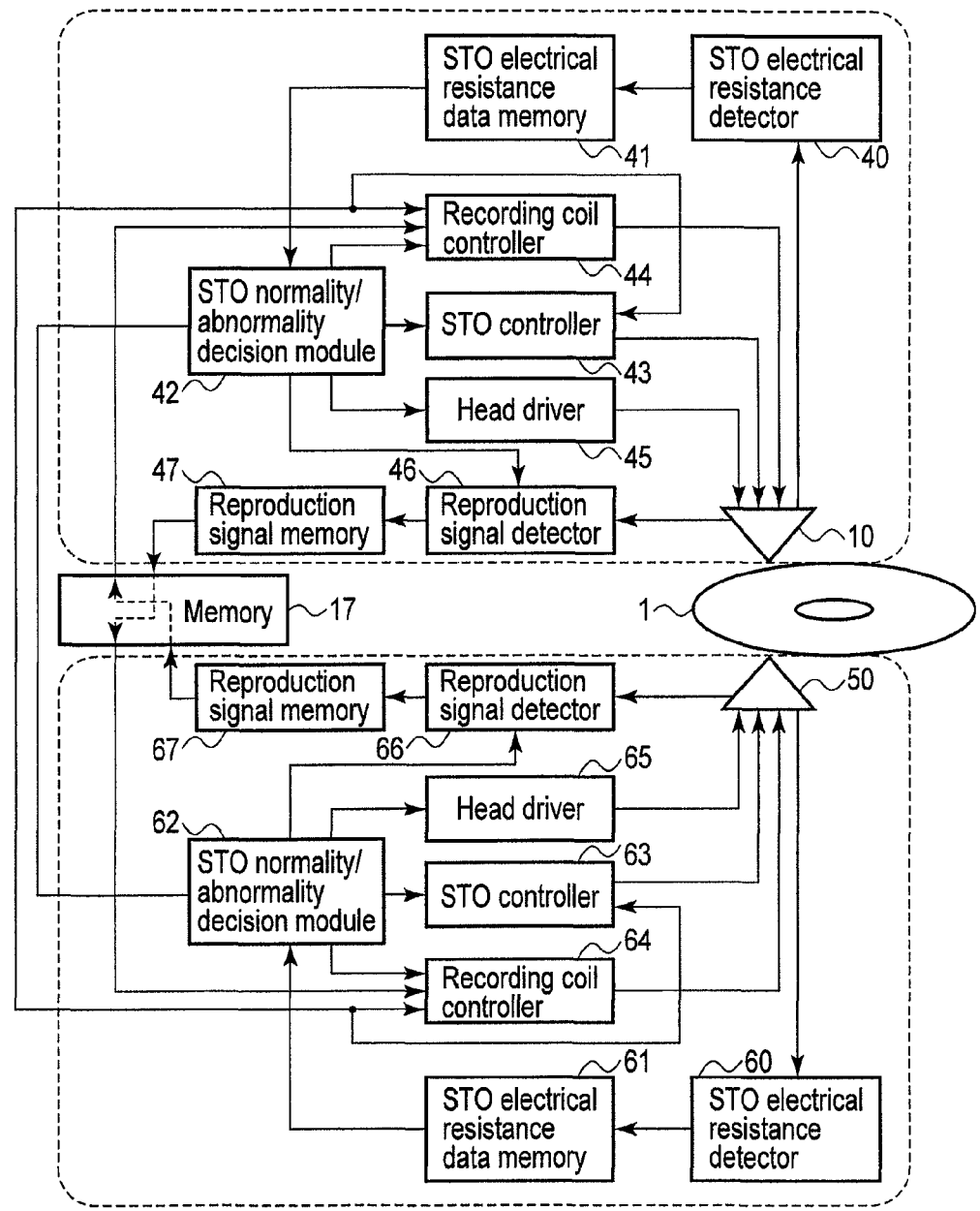
F I G. 4

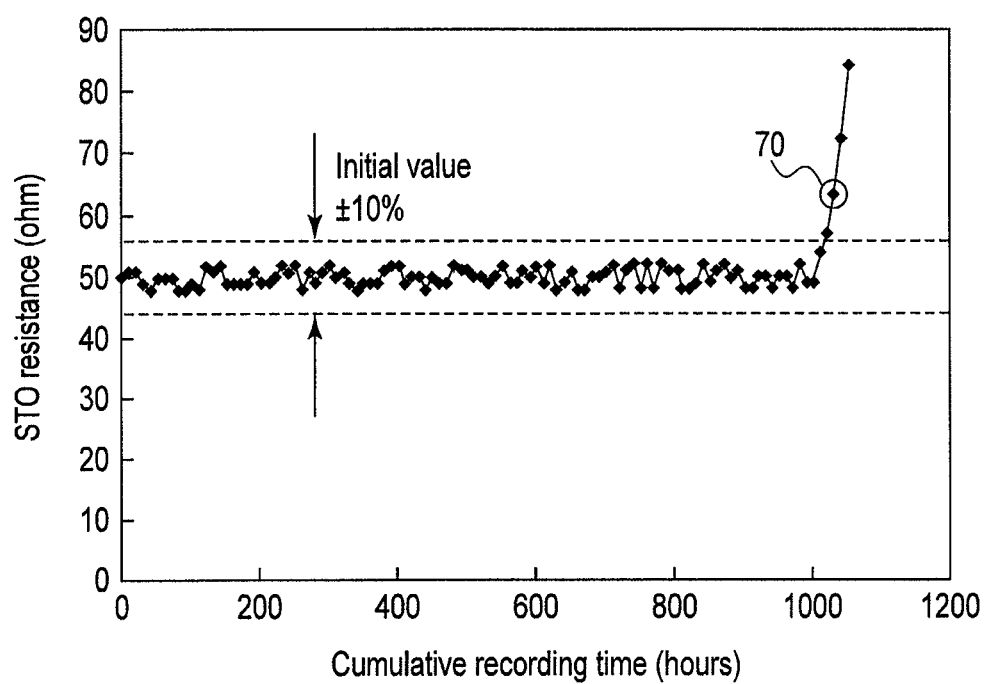
F I G. 7

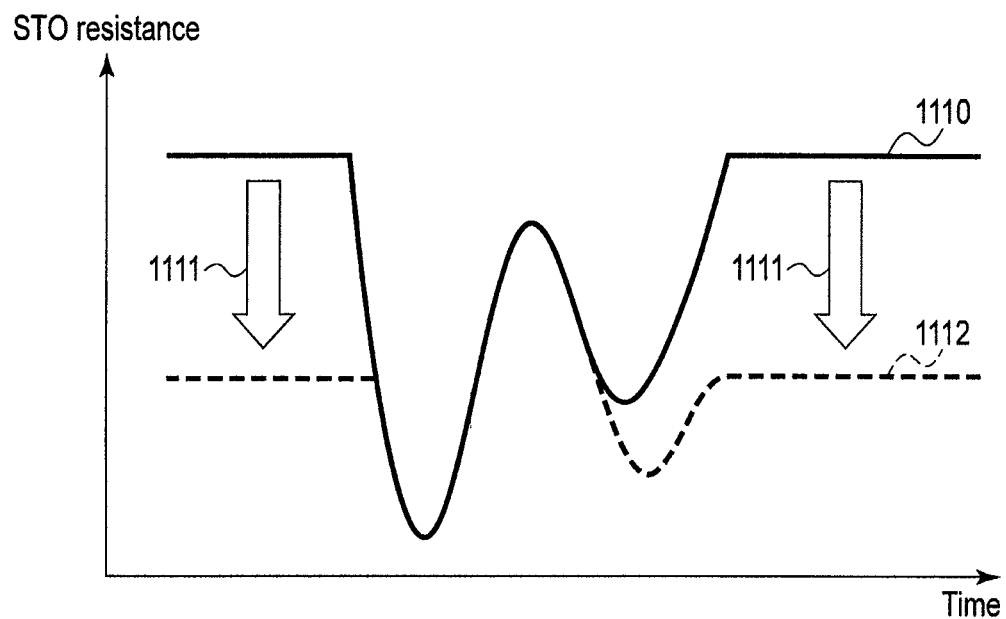
F I G. 11A
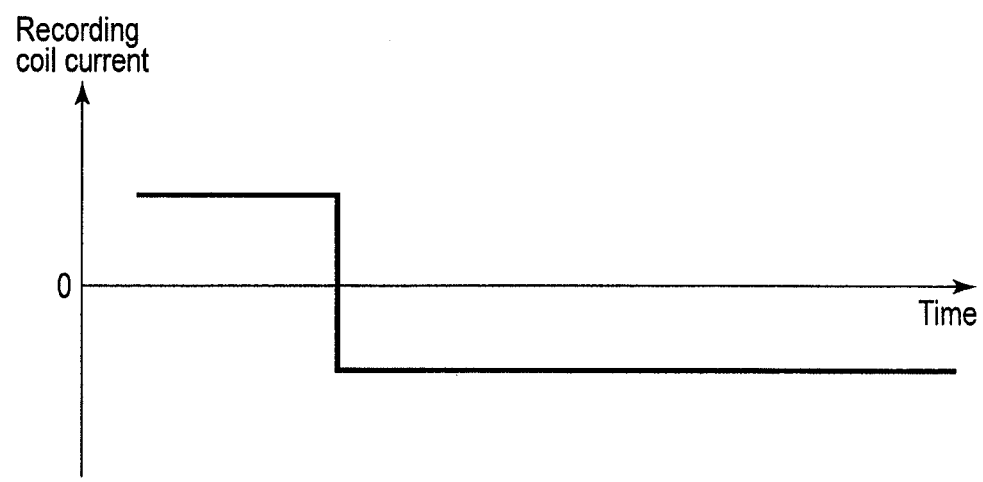
F I G. 11B

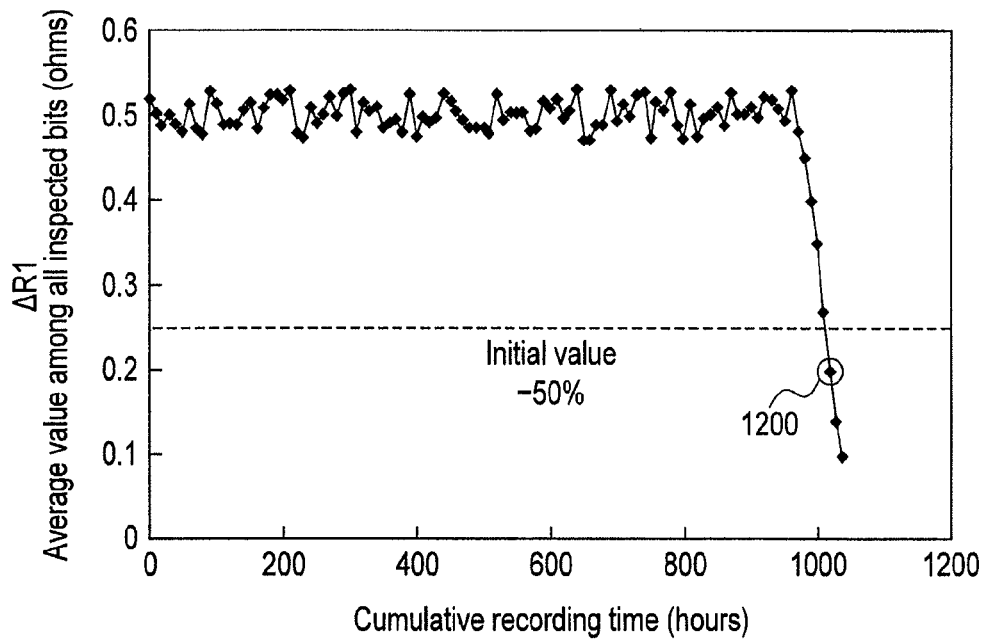
F I G. 1 2
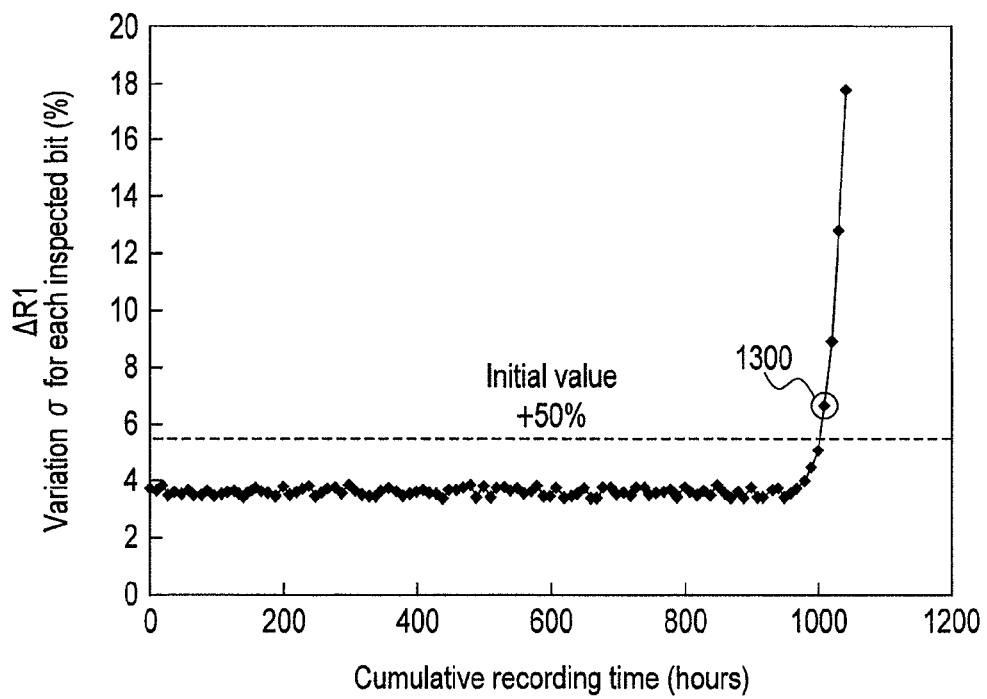
F I G. 1 3

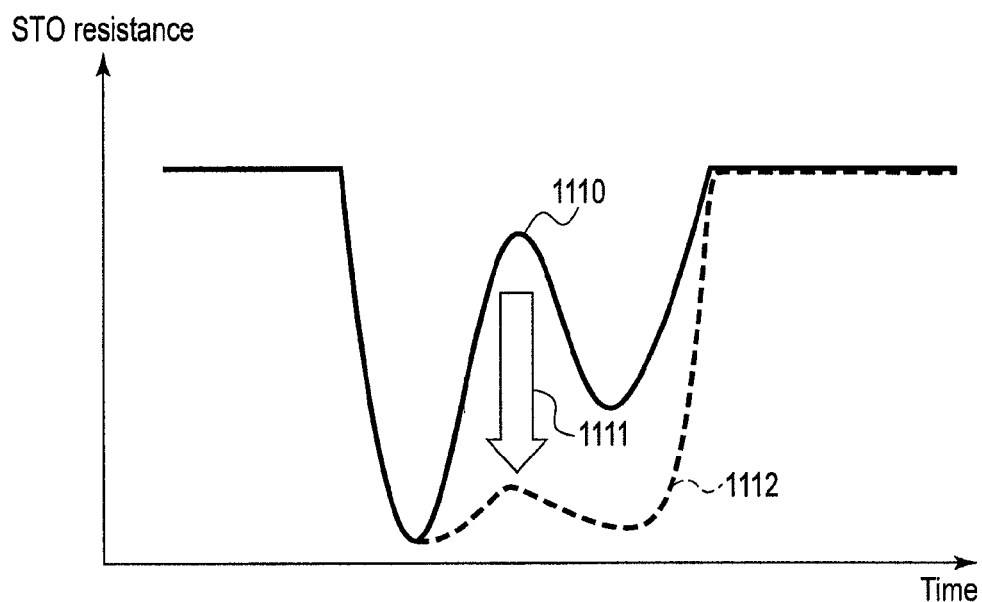
F I G. 14 A
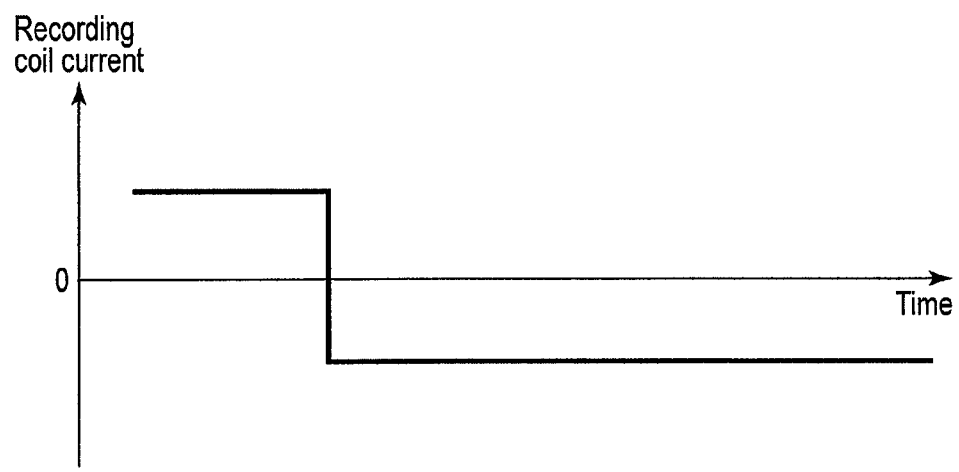
F I G. 14 B

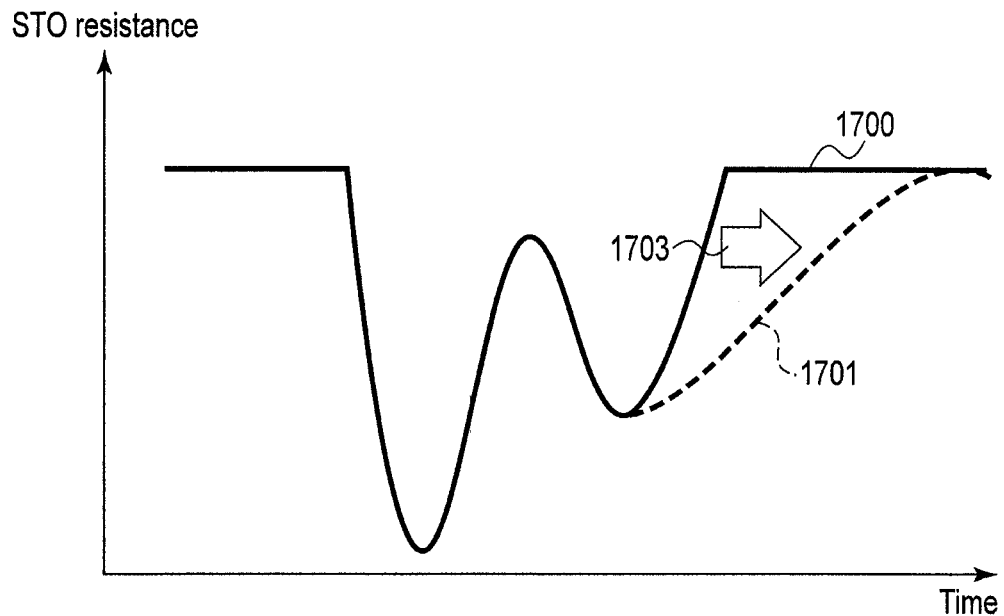
F I G. 17 A
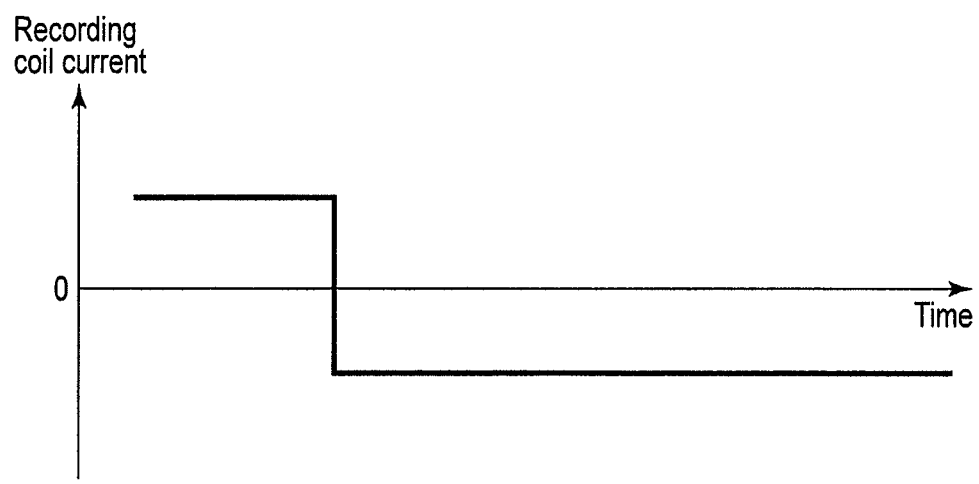
F I G. 17 B

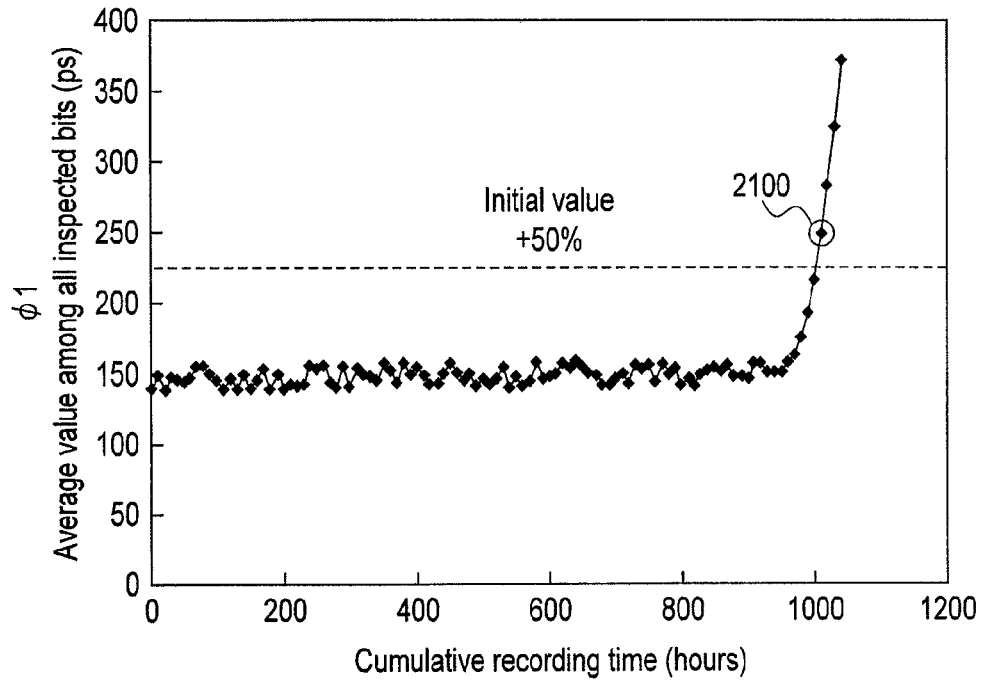
F I G. 21
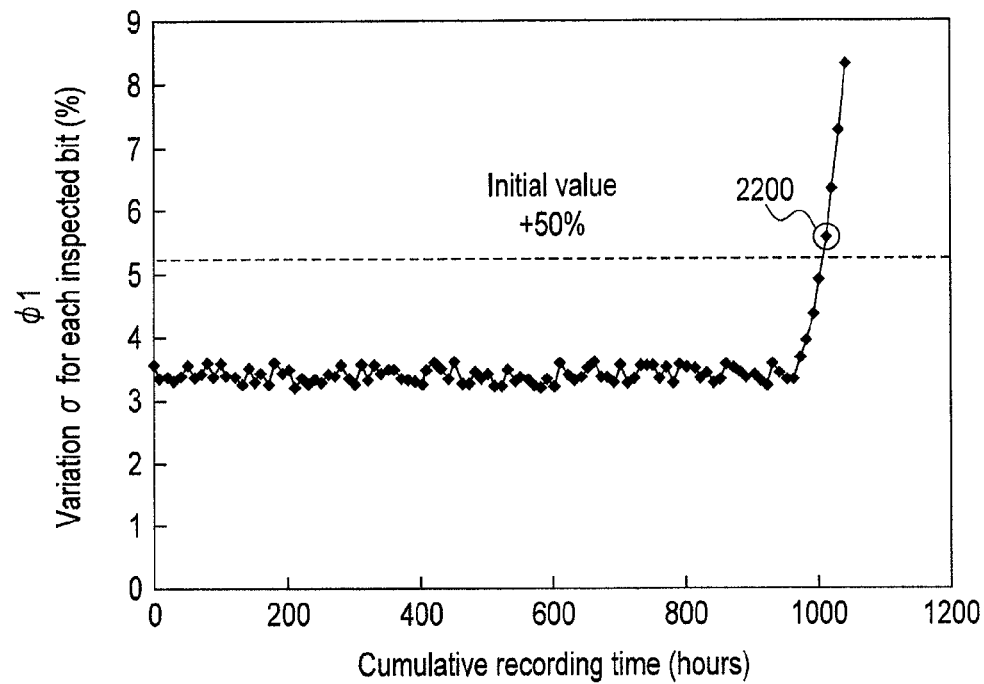
F I G. 22

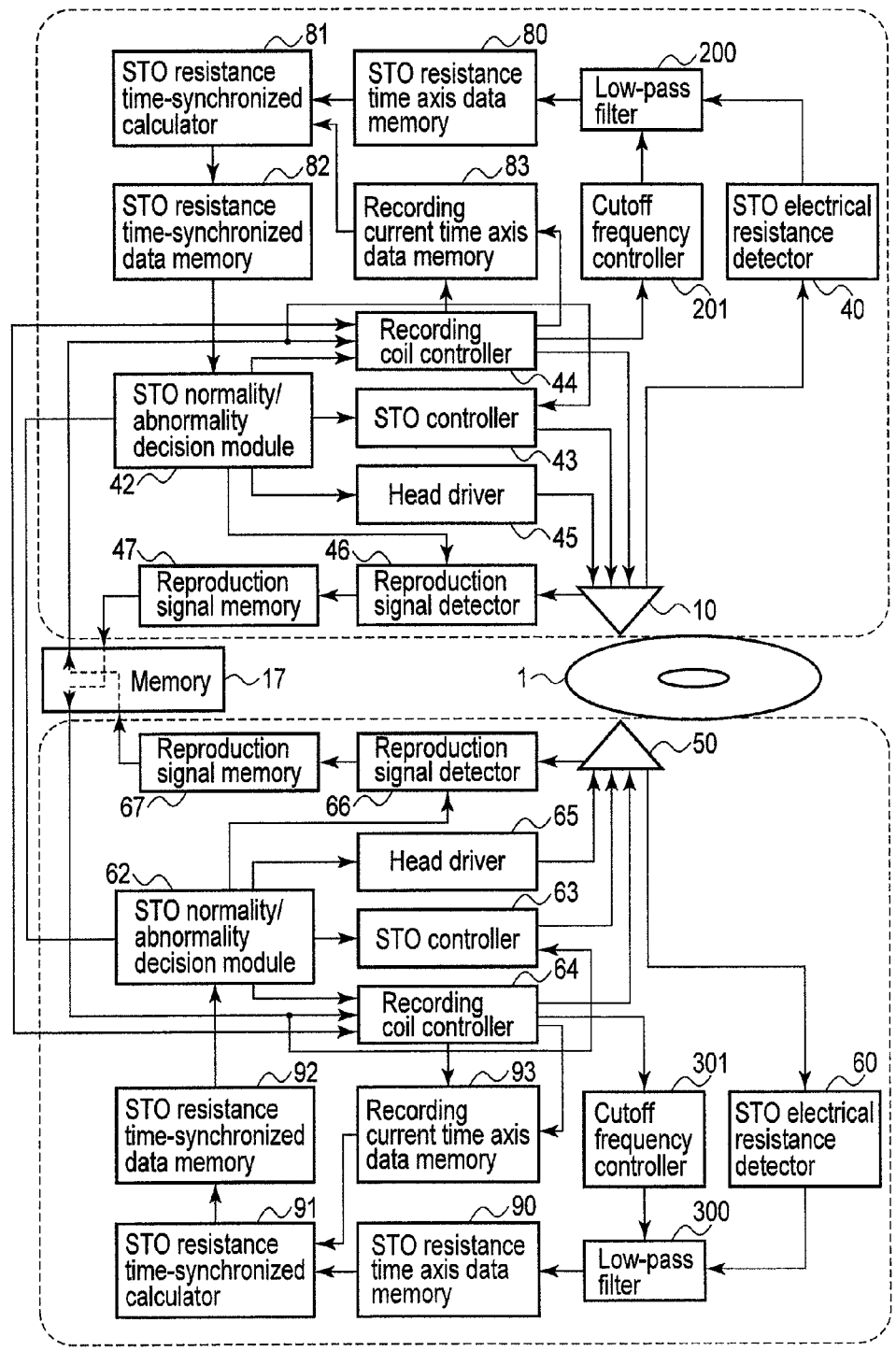
F I G. 2 3

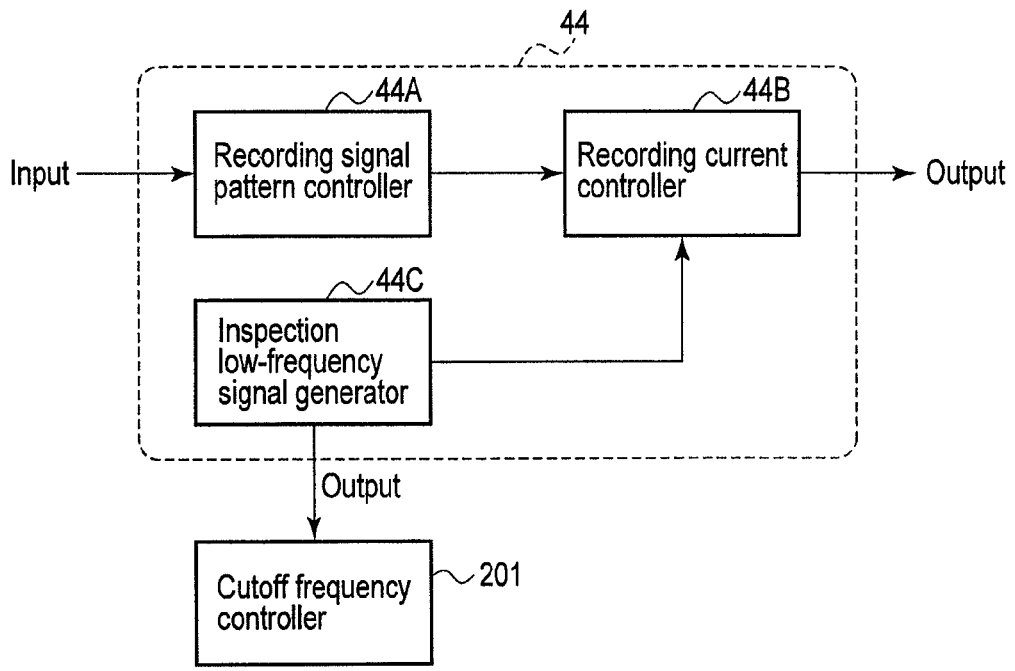
F I G. 24 A
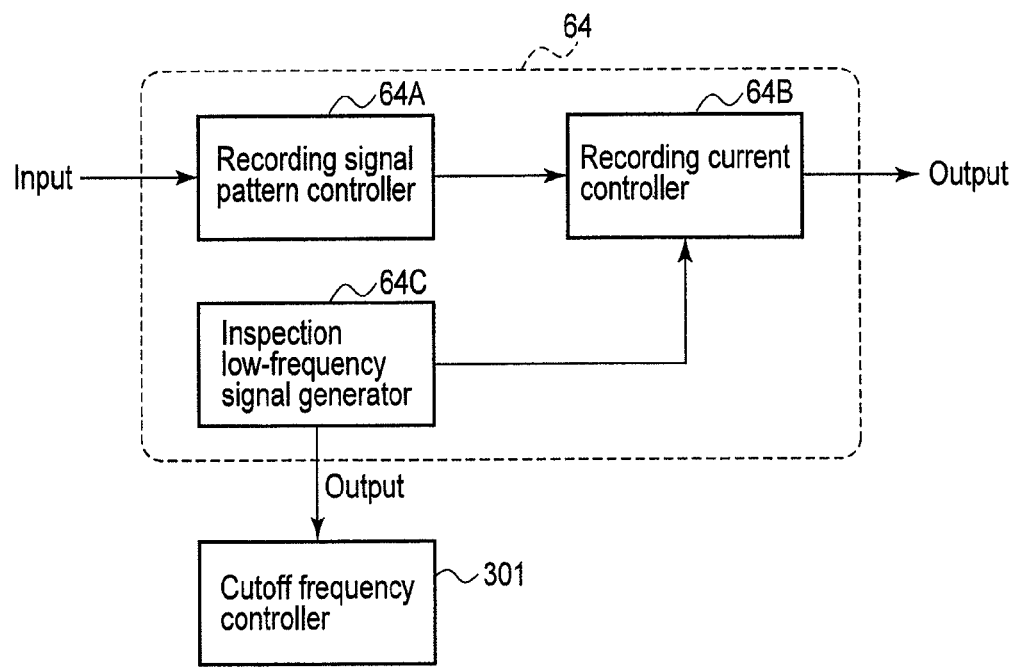
F I G. 24 B

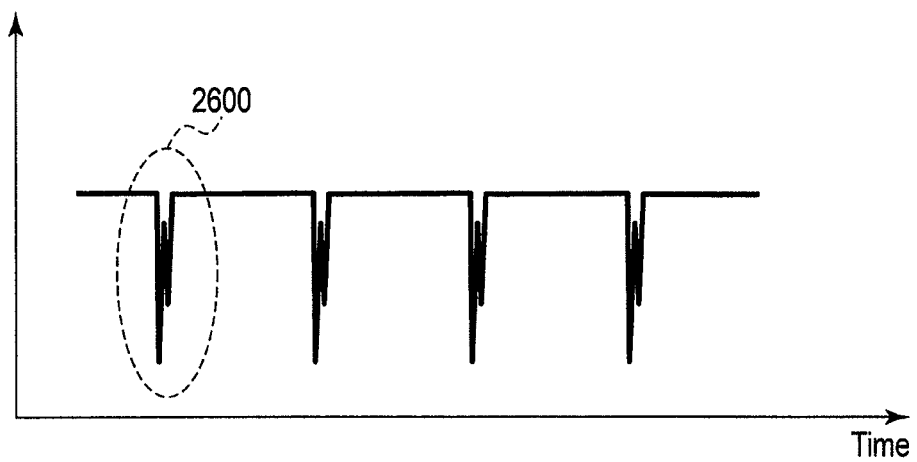
F I G. 26 A
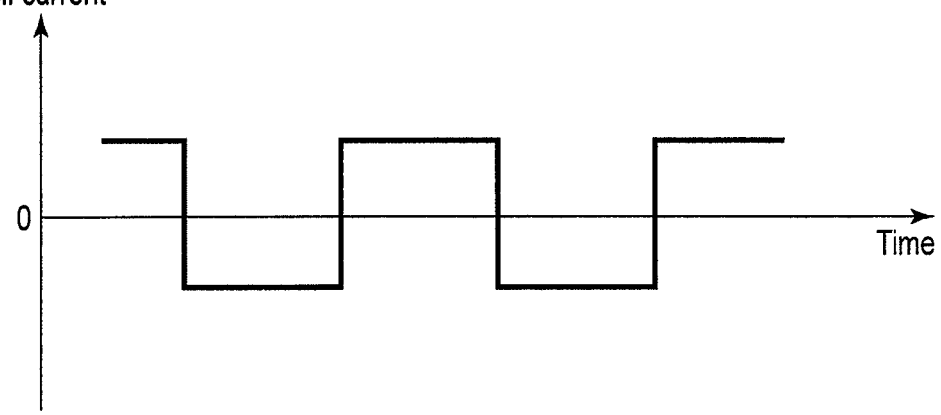
F I G. 26 B

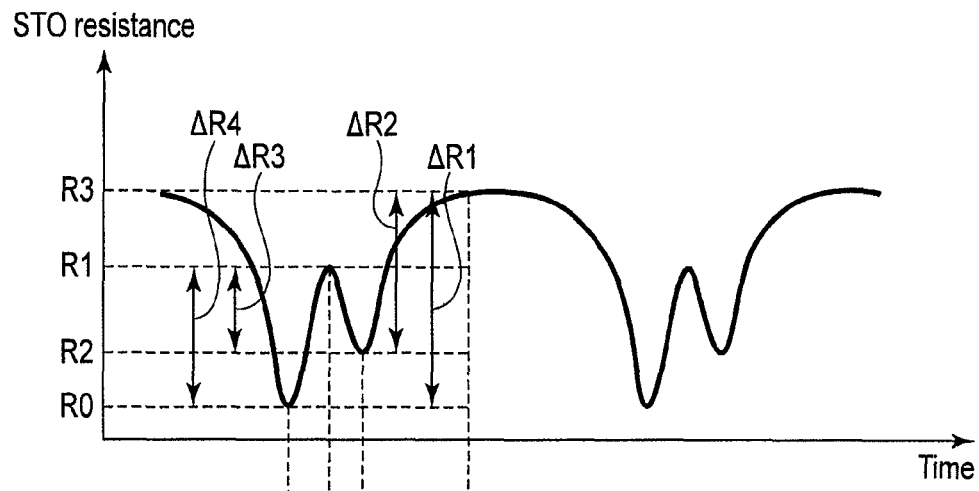
F I G. 27A
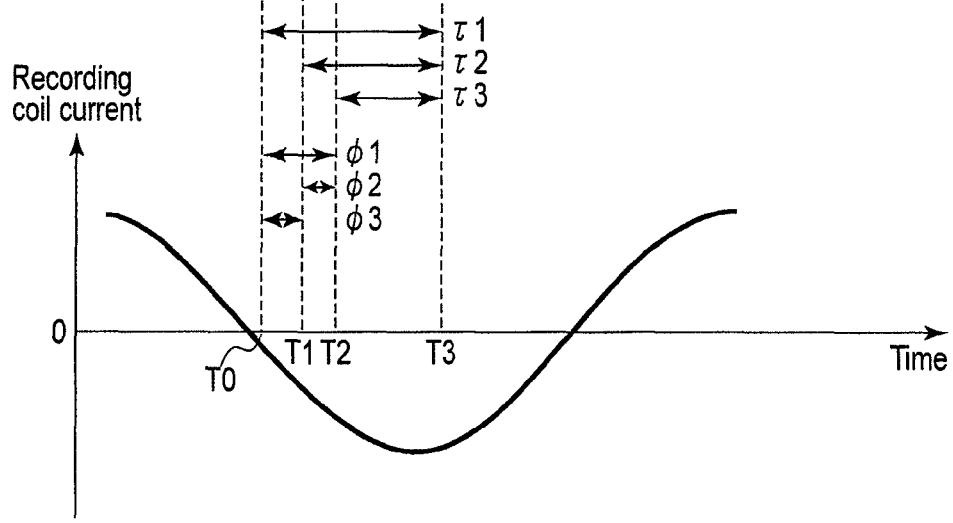
F I G. 27B

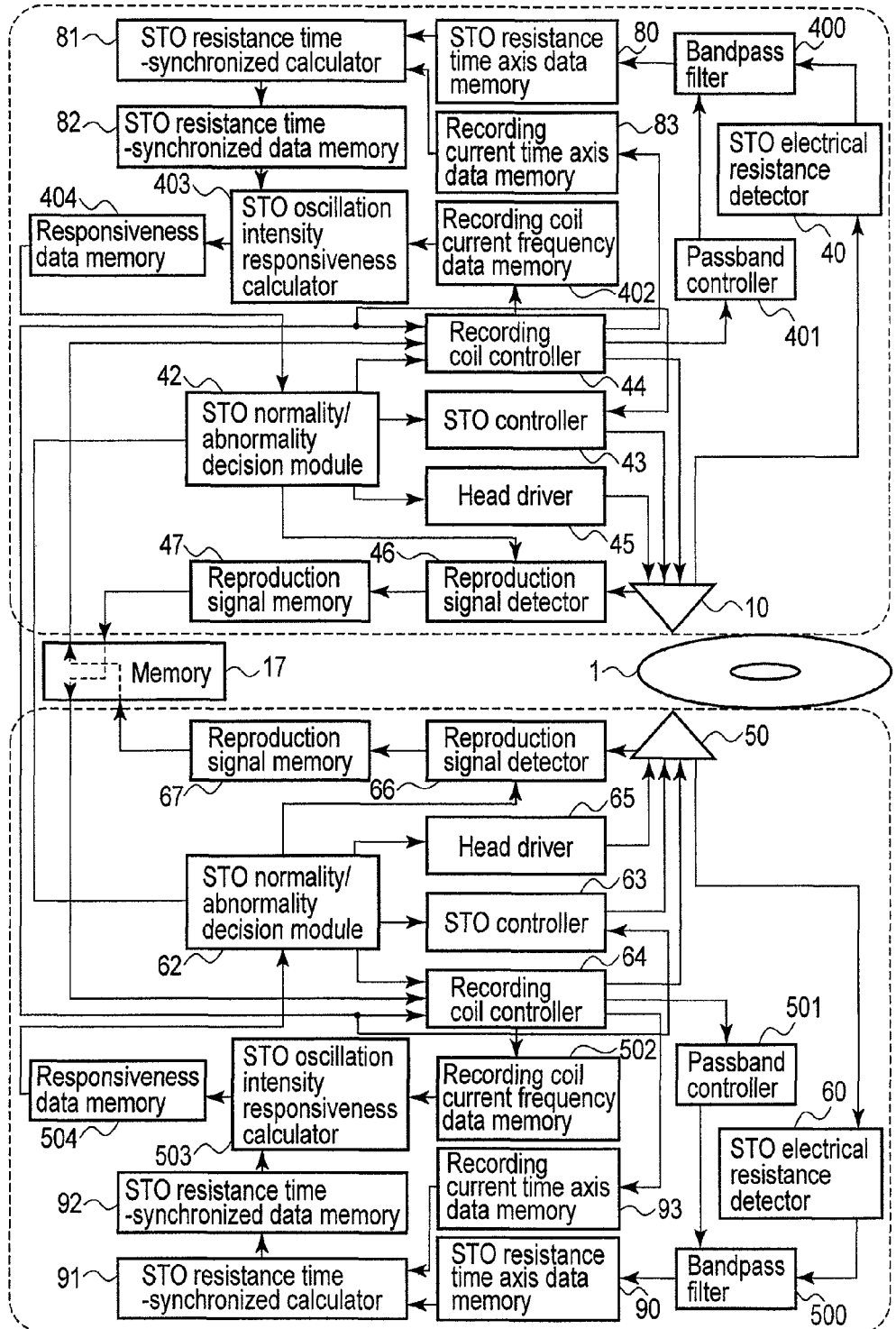
F I G. 2 8

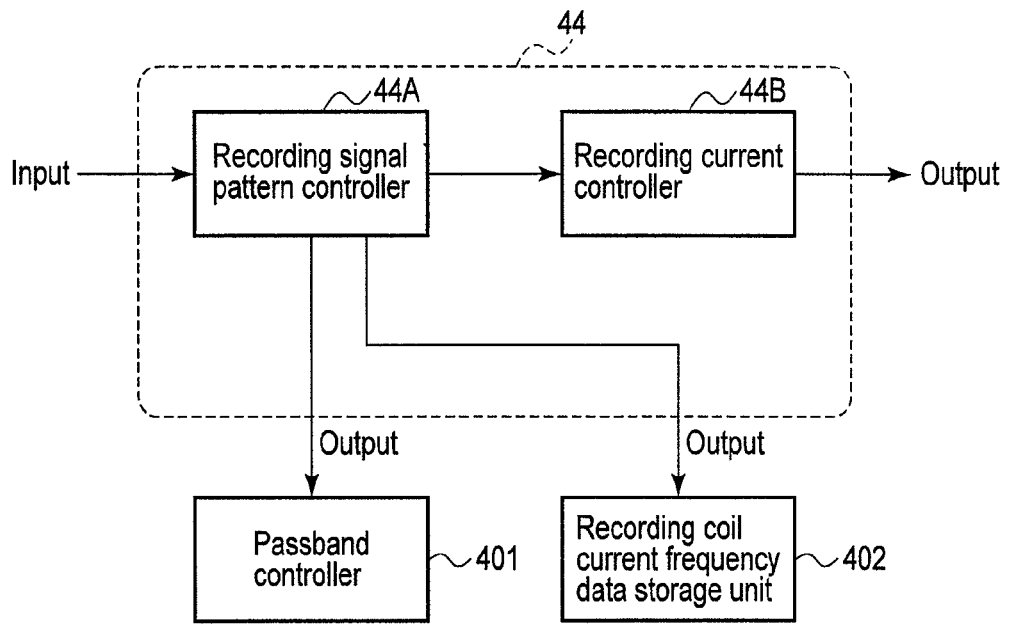
F I G. 2 9 A
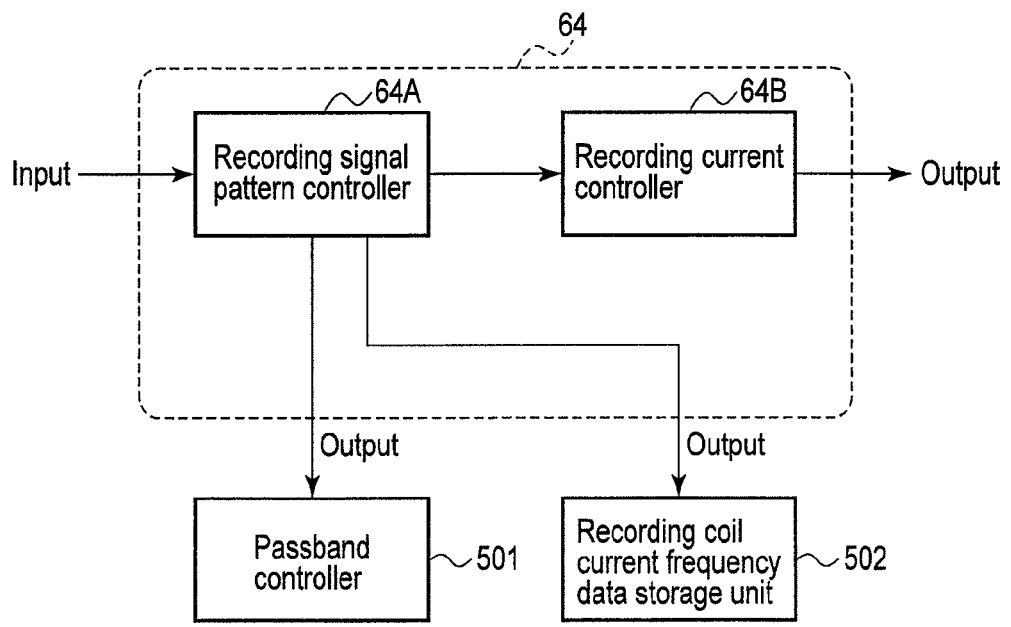
F I G. 2 9 B

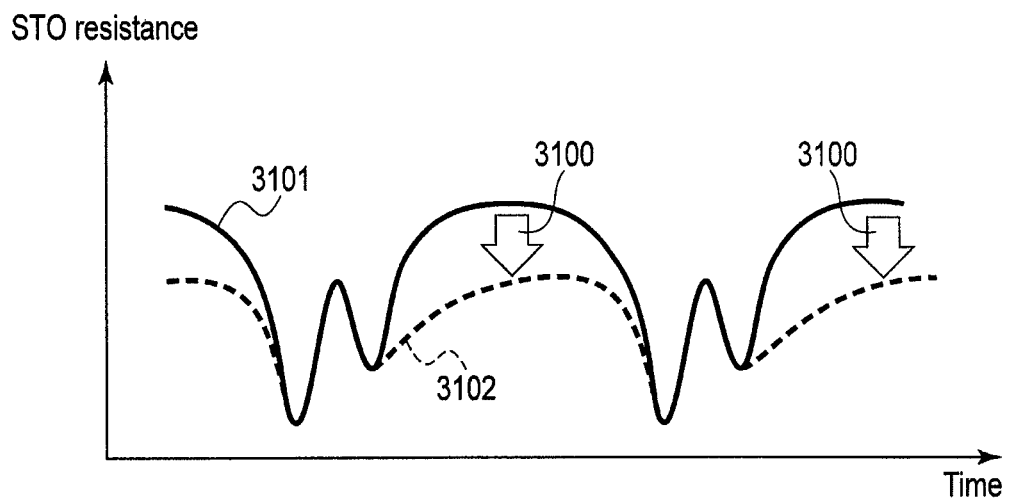
F I G. 3 1 A
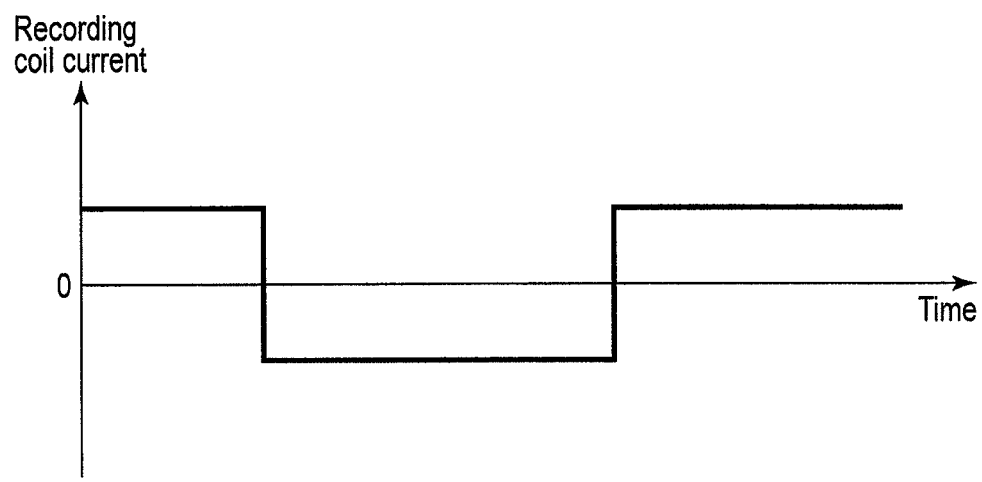
F I G. 3 1 B

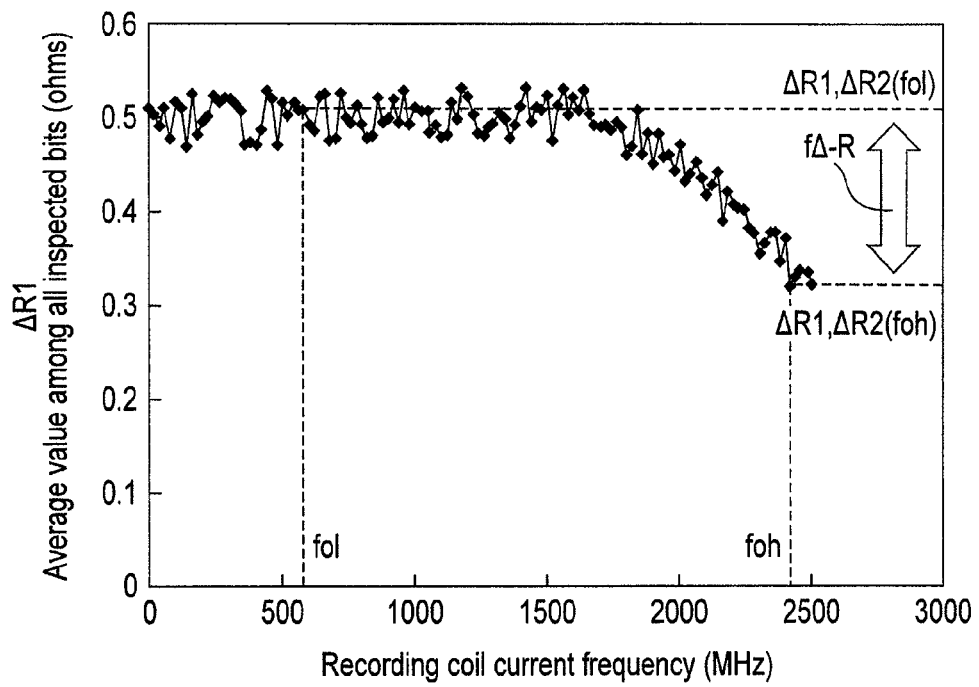
F I G. 3 2
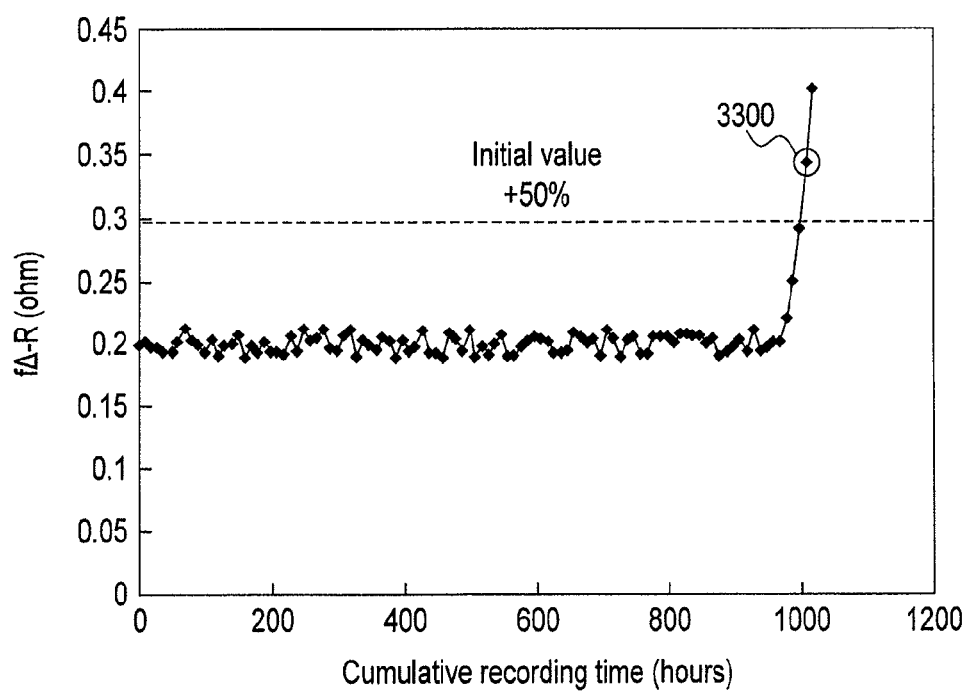
F I G. 3 3

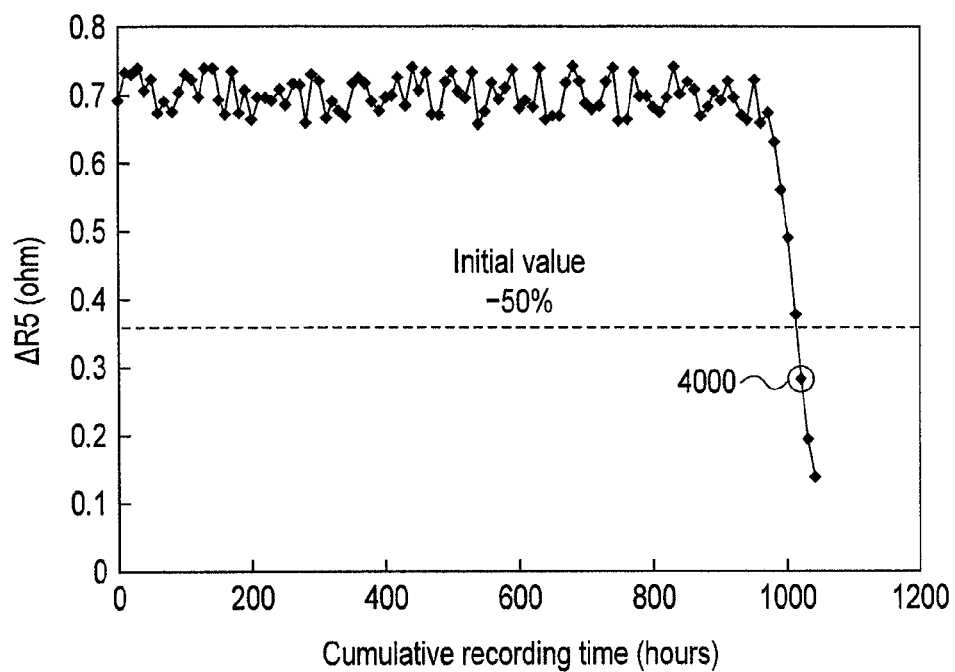
F I G. 4 0
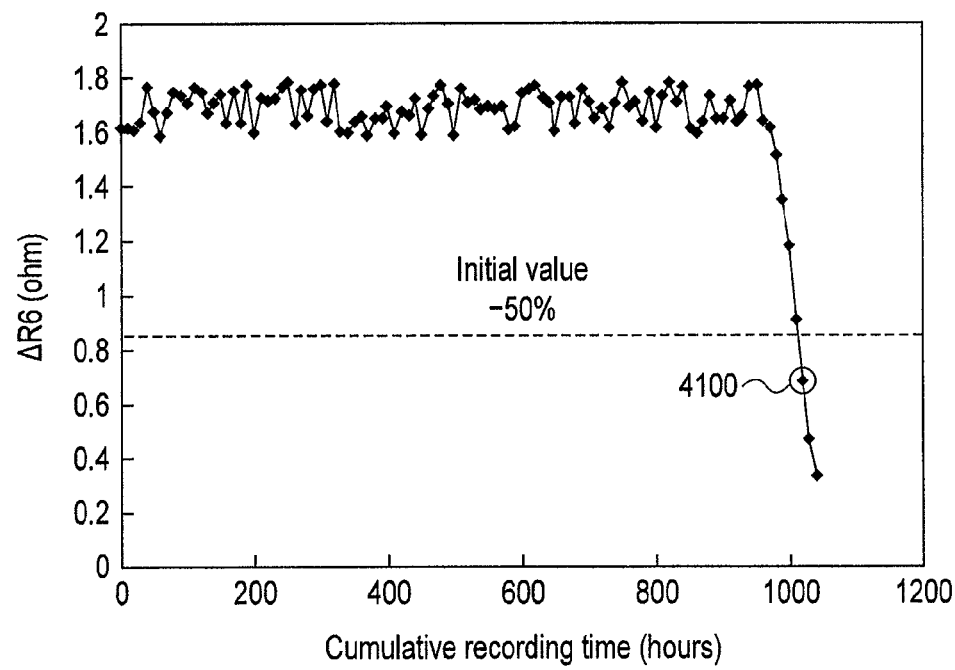
F I G. 4 1

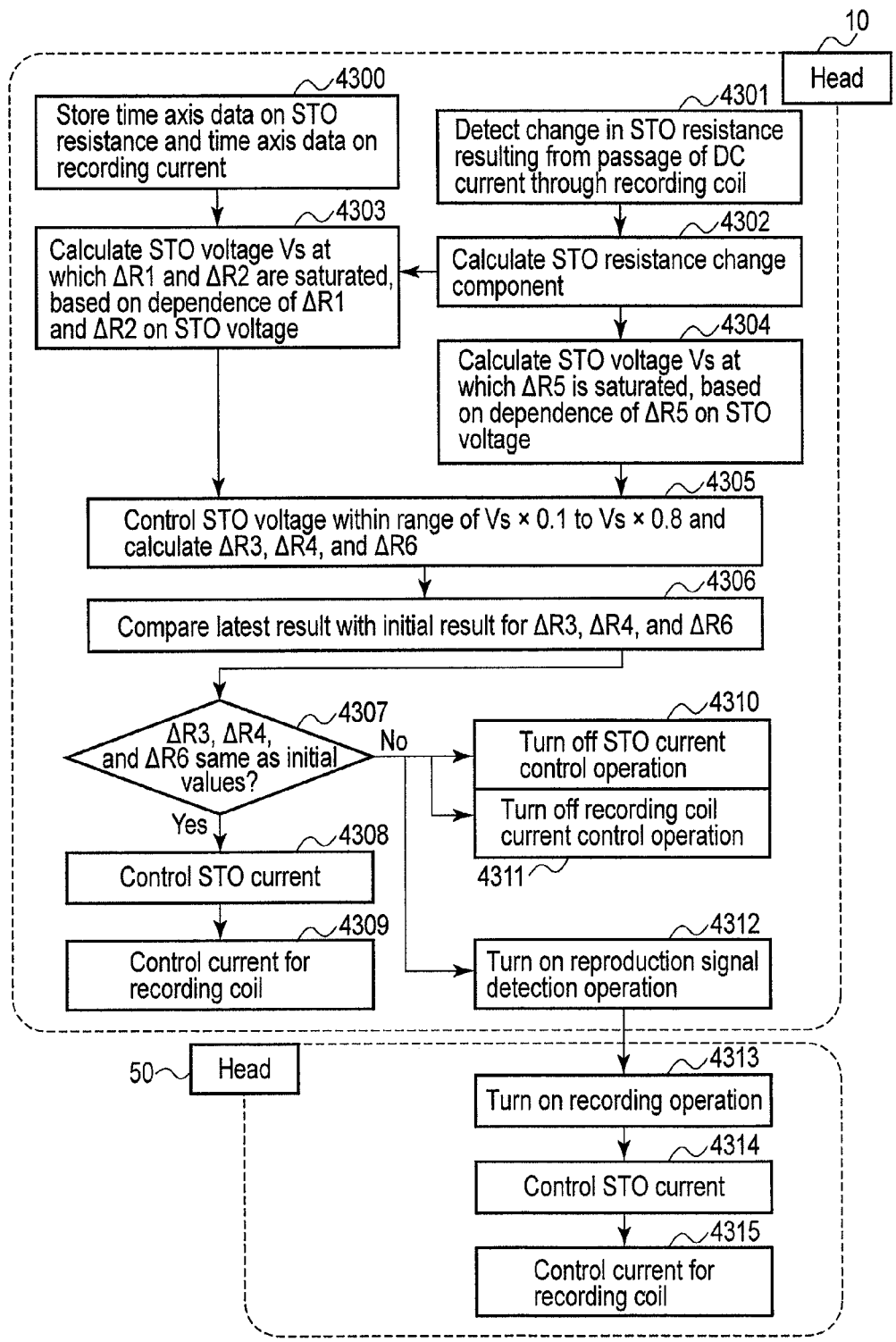
F I G. 43

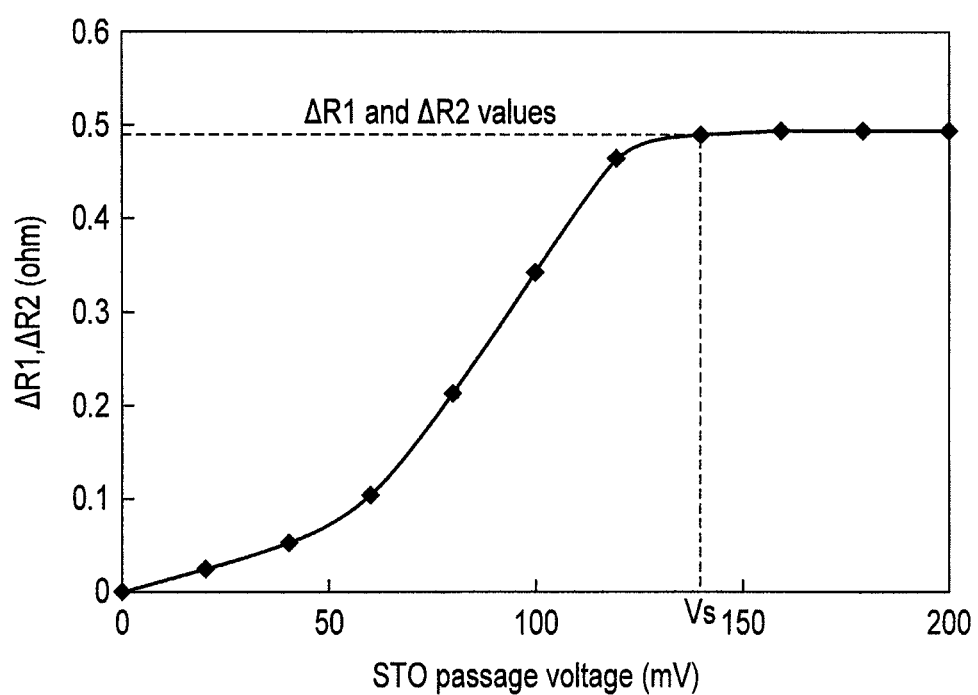
F I G. 4 4

ND METHOD
DISK STORAGE APPARATUS AND METHOD FOR DETERMINING MALFUNCTION OF HIGH-FREQUENCY OSCILLATING ELEMENT

CROSS-REFERENCE TO RELATED APPLICATIONS

This application is based upon and claims the benefit of priority from Japanese Patent Application No. 2012-276052, filed Dec. 18, 2012, the entire contents of which are incorporated herein by reference.

FIELD

Embodiments described herein relate generally to a disk storage apparatus with a high-frequency assisted writing scheme and method.

BACKGROUND

In the field of magnetic disk storage apparatuses (hereinafter sometimes referred to as disk drives) represented by hard disk drives, techniques for perpendicular magnetic recording and high-frequency assisted writing have been developed to facilitate an increase in recording density and recording capacity.

High-frequency assisted recording is a recording scheme in which a magnetic head with a high-frequency assisted element is used to apply a high-frequency magnetic field onto a magnetic disk. As a high-frequency assisted element, for example, a spin-torque oscillator (hereinafter sometimes referred to as an STO) has been gathering attention. The disk drive generates a high-frequency magnetic field by passing a DC current through the STO via an electrode to drive the STO so that the STO works as a source of oscillation.

The conventional disk drive with the magnetic head incorporated therein and comprising the high-frequency assisted element has no function to determine the level of possible oscillation degradation in the high-frequency assisted element. Thus, repeated recording operations of the magnetic head may make destruction of the high-frequency assisted element progress. When the high-frequency assisted element is destroyed, contaminant may be generated in the drive. The contaminant is fine dust or the like and may cause the magnetic head to crash on the magnetic disk. In this case, rescuing data on the magnetic disk corrupted by the head crash is difficult. Furthermore, the disk drive may be likely to fail to operate normally.

BRIEF DESCRIPTION OF THE DRAWINGS

FIG. 4 is a block diagram illustrating a configuration that implements recording and reproduction control according to the first embodiment;

FIG. 7 is a diagram illustrating an example of determination for STO malfunction according to the first embodiment;

FIGS. 11A and 11B are diagrams illustrating degradation of oscillation intensity corresponding to a state of STO malfunction according to the second embodiment;

FIG. 12 is a diagram illustrating a first example of determination for STO malfunction according to the second embodiment;

FIG. 13 is a diagram illustrating a second example of determination for STO malfunction according to the second embodiment;

FIGS. 14A and 14B are diagrams illustrating degradation of a magnetoresistive effect corresponding to the state of STO malfunction according to the second embodiment;

FIGS. 17A and 17B are diagrams illustrating degradation of oscillation responsiveness corresponding to the state of STO malfunction according to the second embodiment;

FIG. 21 is a diagram illustrating a seventh example of determination for STO malfunction according to the second embodiment;

FIG. 22 is a diagram illustrating an eighth example of determination for STO malfunction according to the second embodiment;

FIG. 23 is a block diagram showing a functional configuration that implements recording and reproduction control according to a third embodiment;

FIGS. 24A and 24B are block diagrams showing an internal configuration of a recording coil controller according to the third embodiment;

FIGS. 26A and 26B are diagrams showing an example of time axis data on an STO resistance for normal data recording according to the third embodiment;

FIGS. 27A and 27B are diagrams showing an example of time axis data on the STO resistance obtained when an inspection low-frequency signal is used, according to the third embodiment;

FIG. 28 is a block diagram showing a functional configuration that implements recording and reproduction control according to a fourth embodiment;

FIGS. 29A and 29B are block diagrams showing an internal configuration of a recording coil controller according to the fourth embodiment;

FIGS. 31A and 31B are diagrams illustrating degradation of oscillation responsiveness corresponding to the state of STO malfunction according to the fourth embodiment;

FIG. 32 is a diagram illustrating a first example of an indicator for oscillation responsiveness according to the fourth embodiment;

FIG. 33 is a diagram illustrating a first example of determination for oscillation responsiveness according to the fourth embodiment;

FIG. 40 is a diagram illustrating a first example of determination for STO malfunction according to the fifth embodiment;

FIG. 41 is a diagram illustrating a second example of determination for STO malfunction according to the fifth embodiment;

FIG. 43 is a flowchart illustrating an operation of the recording and reproduction control according to the sixth embodiment; and FIG. 44 is a diagram illustrating an example of dependence of the STO resistance on an STO voltage according to the sixth embodiment.

DETAILED DESCRIPTION

In general, according to one embodiment, a disk storage apparatus includes a magnetic head, a detector, a calculator, and a decision module. The magnetic head has a high-frequency assisted element disposed close to a main magnetic pole that generates a recording magnetic field for perpendicular magnetic recording, the high-frequency assisted element applying a high-frequency magnetic field onto a magnetic disk during data recording. The detector detects an electrical resistance of the high-frequency assisted element. The calculator calculates time axis data indicative of a variation, on a time axis, in the electrical resistance value detected by the detector. The decision module determines whether the high-frequency assisted elements is malfunctioning based on the time axis data.

Various embodiments will be described hereinafter with reference to the accompanying drawings.

[Disk Drive Configuration]

First, a configuration of a disk drive according to a first embodiment will be described. The configuration of the disk drive shown in FIG. 1 is also applied to a second embodiment to a sixth embodiment described below.

Figure 1:
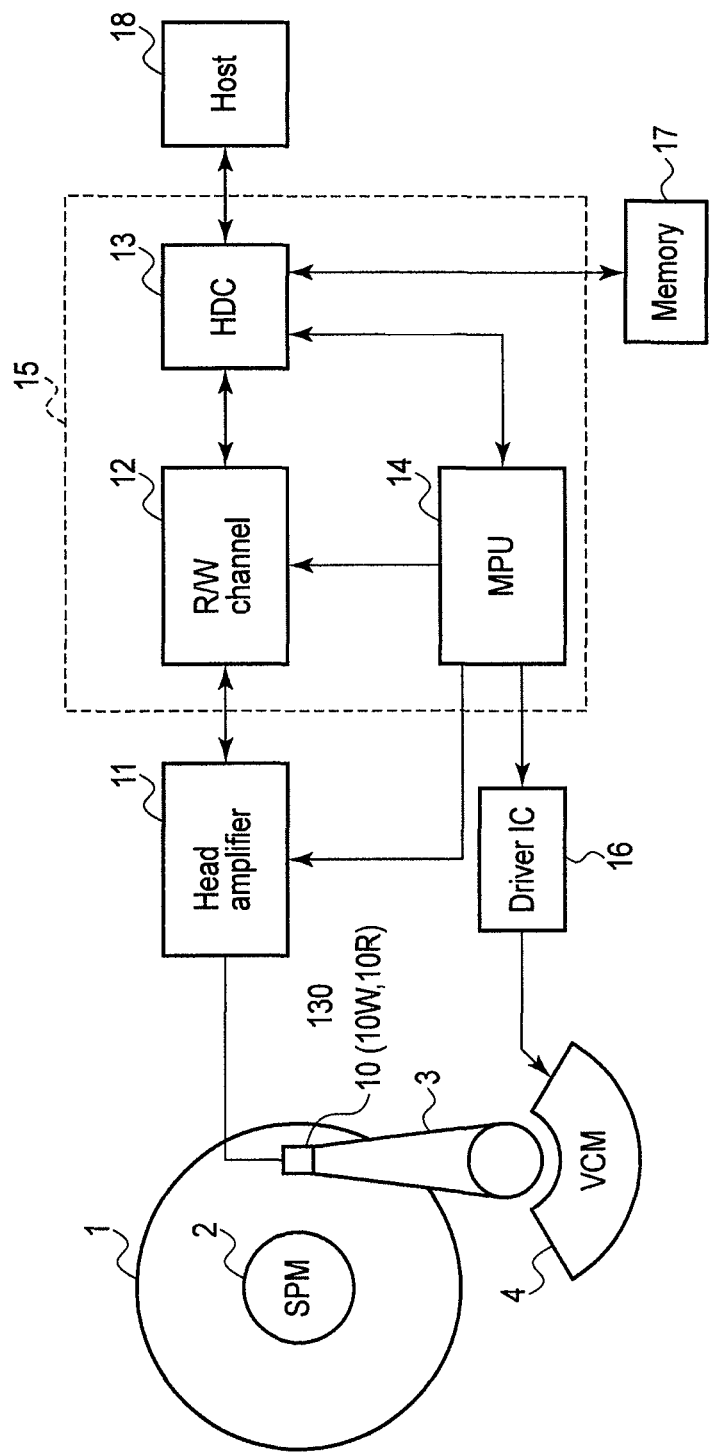
FIG. 1 is a block diagram illustrating a configuration of a disk drive according to a first embodiment.

As shown in FIG. 1, the disk drive is a perpendicular magnetic recording magnetic disk apparatus incorporating a magnetic disk (hereinafter simply referred to as a disk) 1 that is a perpendicular magnetic recording medium and a magnetic head (hereinafter simply referred to as a head) 10 comprising a high-frequency assisted element described below.

The disk 1 is fixedly attached to a spindle motor (SPM) so as to move rotationally. The head 10 is mounted in an actuator 3 and configured to move over the disk 1 in a radial direction thereof. The actuator 3 is rotationally driven by a voice coil motor (VCM) 4. The head 10 comprises a recording head module (sometimes referred to as a write head) 10W and a reproduction head module (sometimes referred to as a read head) 10R.

Moreover, the disk drive comprises a head amplifier integrated circuit (hereinafter referred to as a head amplifier IC) 11, a read/write channel (R/W channel) 12, a hard disk controller (HDC) 13, a microprocessor (MPU) 14, a driver IC 16, and a memory 17. The R/W channel 12, the HDC 13, and the MPU 14 are integrated into an integrated circuit in one chip.

The head amplifier IC 11 includes a circuit group for driving of a spin-torque oscillator (STO) that is a high-frequency assisted element, detection of electrical resistance, and the like. Moreover, the head amplifier IC 11 includes a driver that supplies a write signal (write current) corresponding to write data supplied by the R/W channel 12, to the write head 10W. Furthermore, the head amplifier IC 11 includes a read amplifier that amplifies a read signal output by the read head 10R and that transmits the amplified read signal to the R/W channel 12.

The R/W channel 12 is a signal processing circuit for read/write data. The HDC 13 constructs an interface between the disk drive and a host 18 to control transfer of read/write data. The MPU 14 is a main controller for the disk drive, and controls a read operation and a write operation and performs servo control required to position the magnetic head 10. Moreover, the MPU 14 carries out a process of detecting oscillation degradation in a high-frequency assisted element (STO) according to the present embodiment, as well as related control. The memory 17 includes a buffer memory formed of a DRAM and a flash memory.

Figure 2:
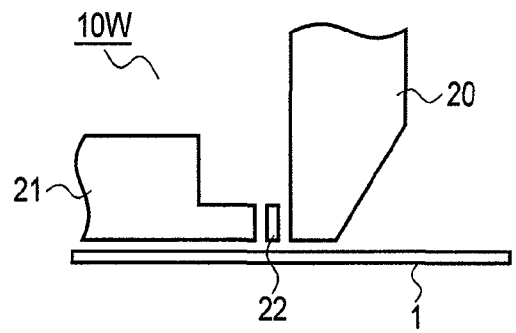
FIG. 2 is a diagram illustrating positional relations for an STO according to the first embodiment.
Figure 3:
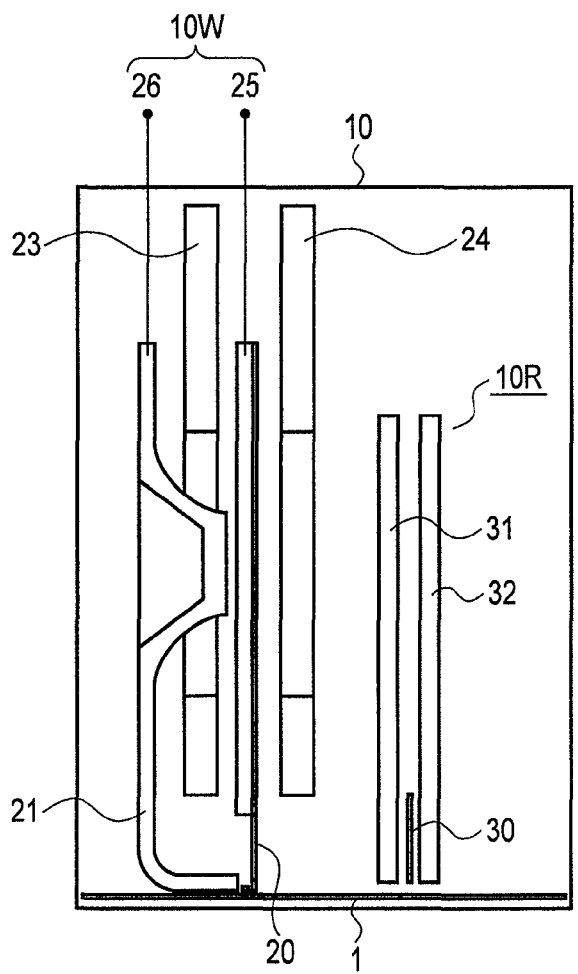
FIG. 3 is a cross-sectional view illustrating the structure of a head according to the first embodiment.

FIG. 2 is a diagram showing positional relations for the high-frequency assisted element (STO) 22 mounted in the write head 10W. FIG. 3 is a diagram illustrating the structure of the head 10.

First, as shown in FIG. 3, the head 10 includes the write head 10W and the read head 10R buried in the same slider separately from each other. The slider comprises an ABS (Air Bearing Surface) that allows the slider to float opposite and away from a recording surface of the disk 1. The write head 10W comprises a magnetic core comprising a main magnetic pole 20 and a return magnetic pole 21 both having a magnetic gap opposite to the recording surface of the disk 1. Terminals 25 and 26 are connected to the main magnetic pole 20 and the return magnetic pole 21, respectively, to pass a DC current through the main magnetic pole 20 and the return magnetic pole 21. Furthermore, coils 23 and 24 for recording current are disposed. The coil 23 is provided so as to be wound around the magnetic core.

Moreover, as shown in FIG. 2, the STO 22 is mounted in a gap in the magnetic core of the write head 10W. The STO 22 is disposed on the ABS side opposite the recording surface of the disk 1. In the write head 10W, a DC current flows in a direction from the main magnetic pole 20 through the STO 22 toward the return magnetic pole 21. Furthermore, as shown in FIG. 3, the read head 10R comprises a magnetic film 30 with a magnetoresistive effect and a pair of shields 31 and 32. The shields 31 and 32 are disposed forward and rearward of the magnetic film 30 in a traveling direction of the head 10 so as to sandwich the magnetic film 30 between the shields 31 and 32.

[Recording and Reproduction Control for the Head]

FIG. 4 is a block diagram showing a configuration provided in the disk drive according to the present embodiment to implement recording and reproduction control for the head. That is, FIG. 4 is a diagram showing the configuration implemented by the head amplifier IC 11, the R/W channel 12, the HDC 13, the MPU 14, the driver IC 16, and the memory 17.

The disk drive comprises two heads 10 and 50 opposed to the respective surfaces of one disk 1. The heads 10 and 50 are mounted in the same actuator 3, and the same configuration carries out the functions of the recording and reproduction control on both the heads 10 and 50. However, for convenience, a configuration for carrying out the functions of the recording and reproduction control on each of the heads 10 and 50 is illustrated.

As shown in FIG. 4, with a current passed between the terminals 25 and 26 by an STO controller 43, 63, a recording coil controller 44, 64 supplies a recording current to the coils 23 and 24 to allow the head 10, 50 to performs magnetic recording on the disk 1. The STO controllers 43 and 63 and the recording coil controllers 44 and 64 are functions carried out by the head amplifier IC 11.

Figure 5A:
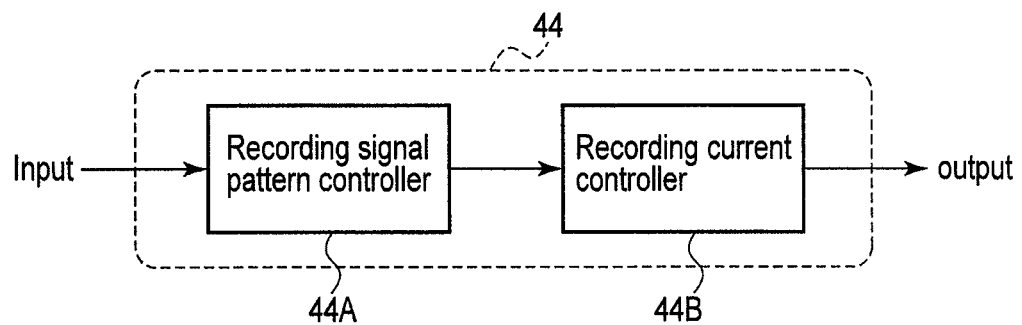
FIGS. 5A and 5B are block diagrams showing a configuration of a recording coil controller according to the first embodiment.
Figure 5B:
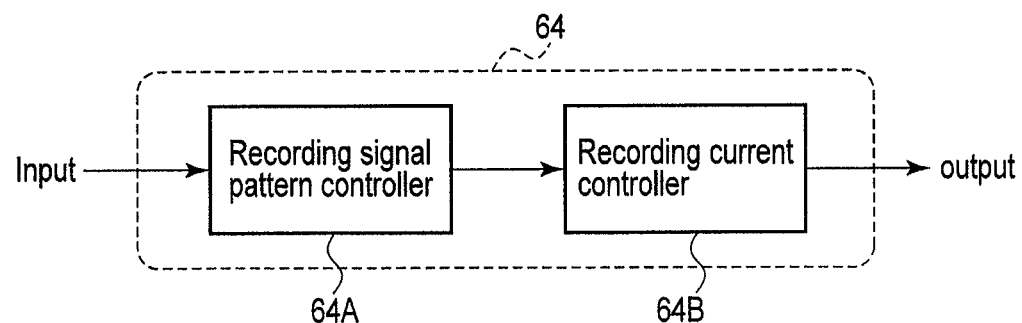

Here, as shown in FIG. 5A, the recording coil controller 44 includes a recording signal pattern controller 44A and a recording current controller 44B. Similarly, as shown in FIG. 5B, the recording coil controller 64 includes a recording signal pattern controller 64A and a recording current controller 64B.

Such recording control allows the head 10, 50 to apply a recording magnetic field from the gap in the magnetic core to the disk 1, while applying a high-frequency magnetic field from the STO 22 locally to the disk (see FIG. 2). Thus, the high-frequency magnetic field is superimposed on the recording magnetic field to enable high-density magnetic recording to be performed on the disk 1.

On the other hand, a reproduction signal detector 44, 46 reproduces recorded information from the disk 1. An STO electric signal resistance detector (hereinafter referred to as an STO resistance detector) 40, 60 detects electrical resistance in the STO 22 in the head 10, 50. In this case, the STO resistance detector 40, 60 observes the voltage of the STO 22 to determine a resistance. An STO data saving module (hereinafter referred to as a resistance data saving module) 41, 61 stores the resistance data on the STO 22 detected by the STO resistance.

Moreover, an STO normality/abnormality decision module 42, 62 determines the STO 22 to be abnormal (defective or degraded) based on the resistance data stored in the resistance data saving module 41, 61. If the STO normality/abnormality decision module 42, 62 determines the STO 22 to be abnormal, the head driver 45, 65 controllably unloads the head 10, 50 from the disk 1.

Here, the reproduction signal detector 46, 66 is a function carried out by the head amplifier IC 11 and the R/W channel 12. The STO resistance detector 40, 60 is a function carried out by the head amplifier IC 11 and the MPU 14. The resistance data saving module 41, 61 is a function carried out by the MPU 14 and the memory 17. The STO normality/abnormality decision module 42, 62 is a function carried out by the MPU 14. The head driver 45, 65 is a function carried out by the MPU 14 and the driver IC 16.

The operation of the recording and reproduction control according to the present embodiment performed by the above-described functional configuration will be described with reference to a flowchart in FIG. 6.

Figure 6:
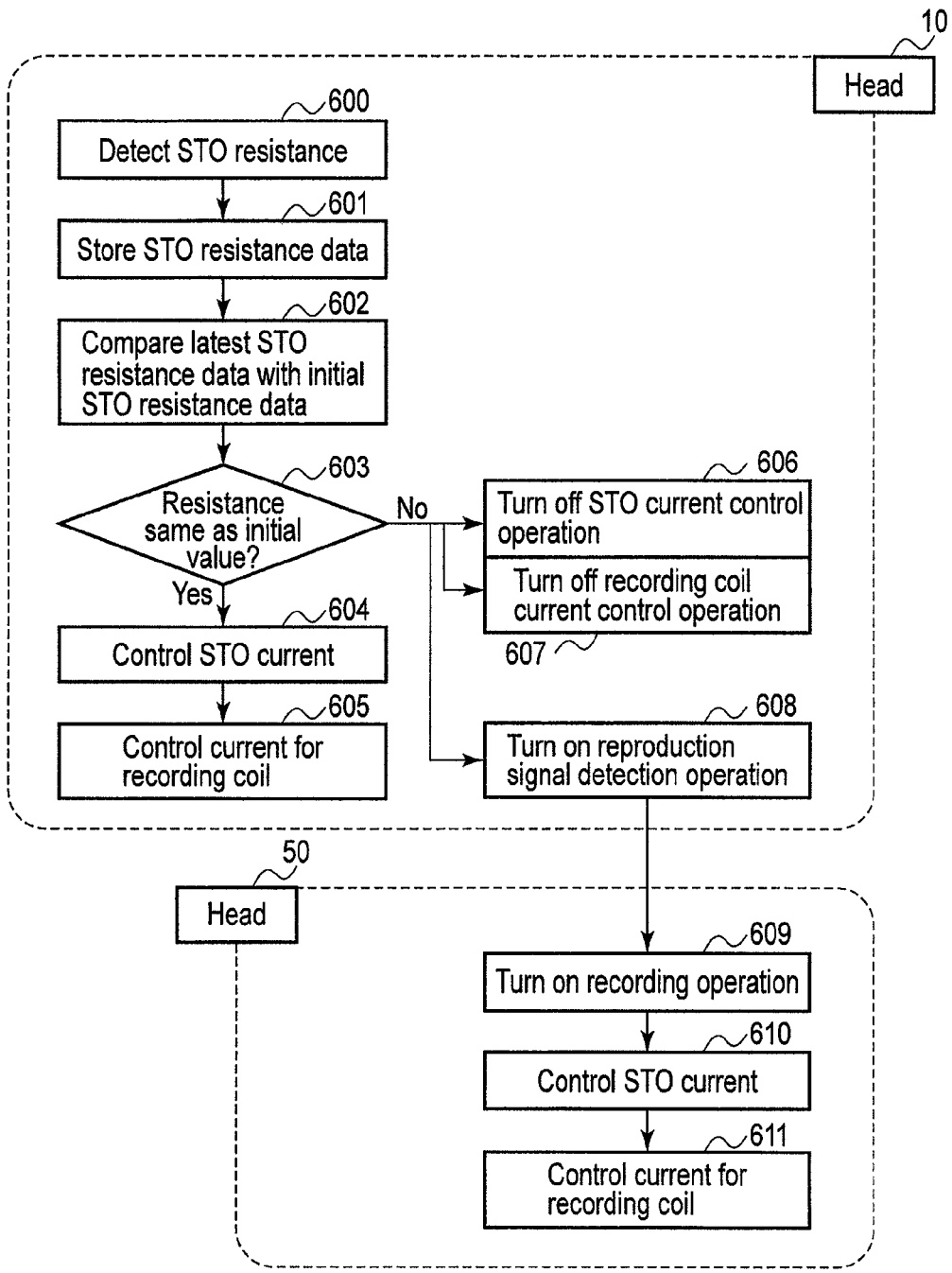
FIG. 6 is a flowchart illustrating an operation of the recording and reproduction control according to the first embodiment.

As shown in FIG. 6, the STO resistance detector 40 in the head 10 detects the electrical resistance of STO 22 (block 600). The resistance data saving module 41 sequentially stores the detected resistance data on the STO 22 (block 601). The STO normality/abnormality decision module 42 compares the latest resistance data on the STO 22 with initial resistance data (initial value) on the STO 22 based on the resistance data stored in the resistance data saving module 41 (block 602). The STO normality/abnormality decision module 42 checks whether or not the latest resistance is equivalent to the initial value based on the comparison result (block 603).

If the latest resistance is equivalent to the initial value, the STO normality/abnormality decision module 42 determines the STO 22 to be normal (YES in block 603). Based on the determination result, the STO controller 43 performs current control to pass a current through the STO 22 (block 604). Moreover, the recording coil controller 44 performs current control to supply a recording current to the coil 23, 24 (block 605). Thus, high-density magnetic recording is carried out on the disk 1 to apply a recording magnetic field and a high-frequency magnetic field to the disk 1.

On the other hand, if the latest resistance deviates from the initial value, the STO normality/abnormality decision module 42 determines the STO 22 to be abnormal and malfunctioning (NO in block 603). FIG. 7 shows an example of determination for STO malfunction. That is, as shown in FIG. 7, if the latest STO resistance deviates from the initial value by 10% or more and exceeds an allowable range, the STO normality/abnormality decision module 42 determines the STO 22 to be abnormal and malfunctioning (that is, oscillation degradation is occurring). Here, at a time when the allowable range is exceeded, the cumulative time of recording operations of the disk drive is longer than 1,000 hours, as shown in FIG. 7.

Referring back to FIG. 6, upon determining that the STO 22 is malfunctioning, the STO normality/abnormality decision module 42 outputs an operation off command to the STO controller 43 (block 606). At the same time, the STO normality/abnormality decision module 42 outputs an operation off command to the recording coil controller 44 (block 607). Moreover, the STO normality/abnormality decision module 42 outputs an operation on command to the head driver 45 and the reproduction signal detector 46 (block 608). Thus, the reproduction signal detector 46 reproduces recorded data from the disk surface over which the head 10 is traveling, and stores the reproduced data in the memory 17 via the reproduction signal saving module 47.

Subsequently, the STO normality/abnormality decision module 62 outputs a recording operation on command to the STO controller 63 and recording coil controller 64 in the head 50 (block 609). Thus, the STO controller 63 performs current control to pass a current through the STO 22 in the head 50 (block 610). Moreover, the recording coil controller 64 performs current control to supply a recording current to the coils 23 and 24 in the head 50 (block 611). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The present embodiment observes a time axis change in the resistance of the STO 22 in the magnetic head, which is a high-frequency assisted element. This allows periodic monitoring of a variation in the oscillation intensity of the STO 22 with respect to the initial state. Thus, malfunction caused by degradation of the STO 22 can be detected early to avoid a possible abnormal recording operation. Furthermore, the data on one disk surface recorded by the head in which the degradation of the STO 22 exceeds the allowable range can be rescued by being reproduced and moved to another disk surface.

Furthermore, the progress of destruction of the STO 22 can be avoided by detecting oscillation degradation in the STO 22 to halt the recording operation. This enables generation of contaminants in the disk drive to be prevented, which may occur when the STO 22 is destroyed.

Second Embodiment

Figure 8:
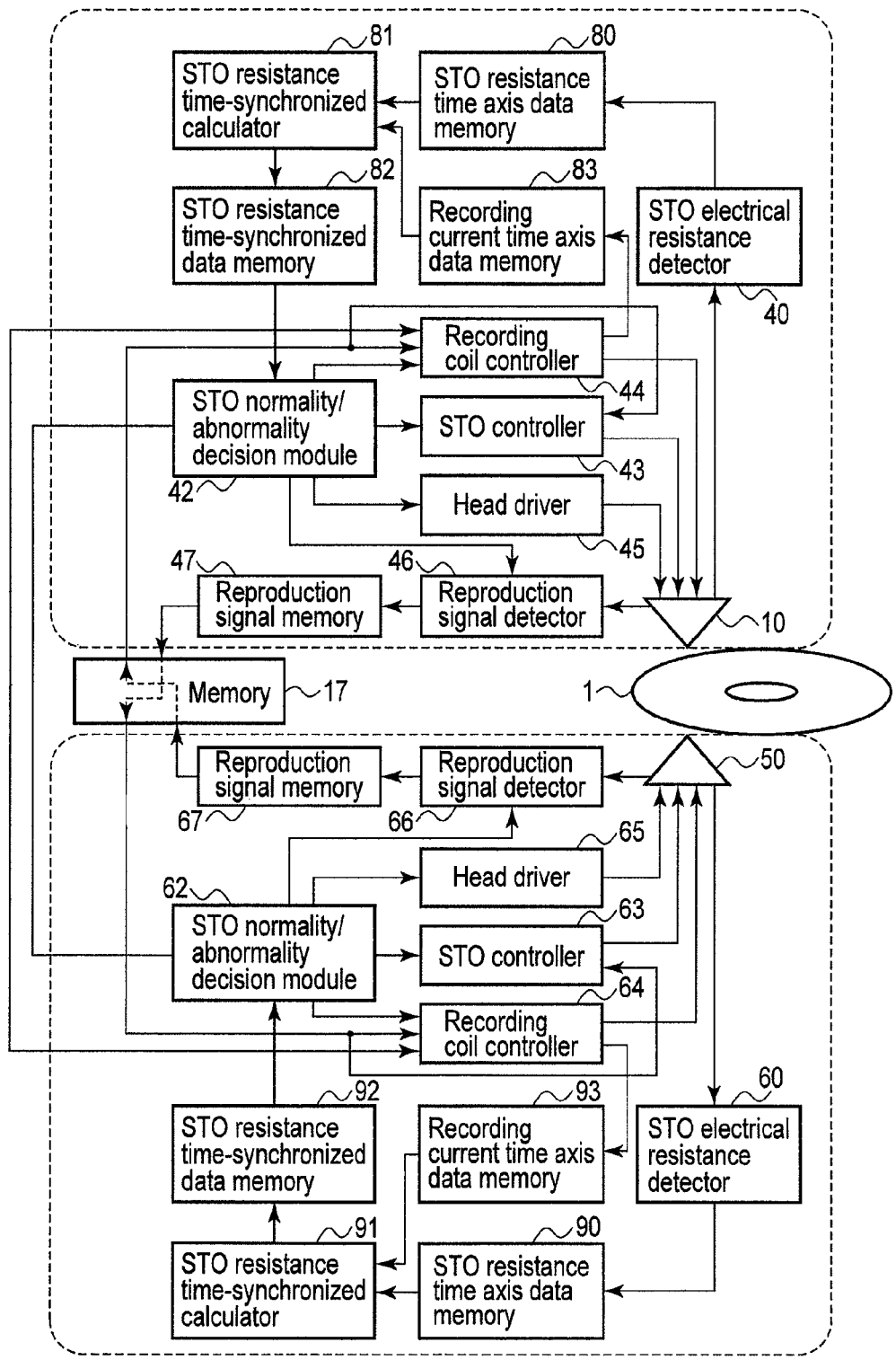
FIG. 8 is a block diagram illustrating a configuration that implements recording and reproduction control according to a second embodiment.

FIG. 8 is a block diagram showing a configuration for implementing recording and reproduction control for a head. As is the case with the first embodiment, heads 10 and 50 are mounted in the same actuator 3, and the same configuration performs the recording and reproduction control on both the heads 10 and 50. However, for convenience, a configuration for carrying out the functions of the recording and reproduction control on each of the heads 10 and 50 is illustrated. Components of the second embodiment which are similar to the corresponding components of the first embodiment shown in FIG. 4 are denoted by the same reference numbers and will not be described below.

According to the present embodiment, an STO resistance time axis data saving module (hereinafter referred to as a resistance time axis data saving module) 80, 90 stores time axis data on the resistance of an STO 22 detected by an STO resistance detector 40, 60. The STO resistance detector 40, 60 may be configured to connect to a low-pass filter or a band-pass filter. The resistance time axis data saving module 80, 90 is a function carried out by an MPU 14 and a memory 17. An STO resistance time-synchronized calculator (hereinafter referred to as a time-synchronized calculator) 81, 91 calculates time-synchronized data on a resistance synchronized with time axis data on a recording current stored in a recording current time-axis data saving module (hereinafter referred to as a current time-axis data saving module) 83, 93, from time axis data on the resistance stored in the resistance time axis data saving module 80, 90. The current time-axis data saving module 83, 93 stores time axis data on a recording current output by a recording coil controller 44, 64. The time-synchronized calculator 81, 91 is a function carried out by the MPU 14. Furthermore, the current time-axis data saving module 83, 93 is a function carried out by the MPU 14 and the memory 17.

A resistance time-synchronized data saving module 82, 92 stores time-synchronized data on the resistance calculated by the time-synchronized calculator 81, 91. The resistance time-synchronized data saving module 82, 92 is a function carried out by the MPU 14 and the memory 17. An STO normality/abnormality decision module 42, 62 determines whether or not the STO is abnormal (defective or degraded) based on the time-synchronized data on the resistance stored in the time-synchronized data saving module 82, 92.

The operation of the recording and reproduction control according to the present embodiment will be described below with reference to a flowchart in FIG. 9.

Figure 9:
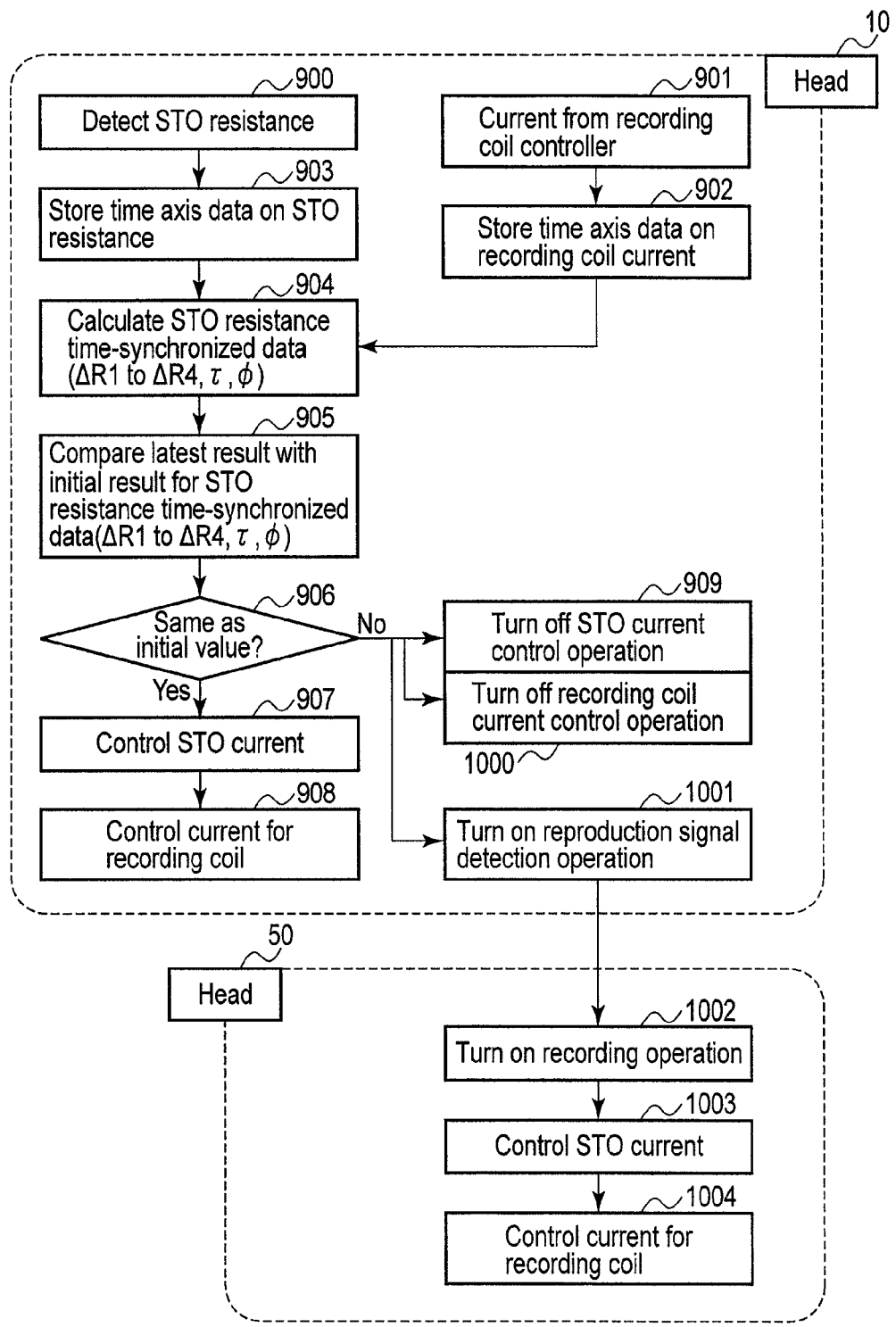
FIG. 9 is a flowchart illustrating an operation of the recording and reproduction control according to the second embodiment.

As shown in FIG. 9, the STO resistance detector 40 in the head 10 detects the electrical resistance of the STO 22 (block 900). The resistance time axis data saving module 80 stores time axis data on the detected resistance of the STO 22 (block 903). Furthermore, the recording coil controller 44 performs current control to supply a recording current to the coils 23 and 24 (block 901). The current time-axis data saving module 83 stores time axis data on the recording current (block 902).

The time-synchronized calculator 81 uses the time axis data on the resistance stored in the resistance time axis data saving module 80 and the time axis data on the recording current stored in the current time-axis data saving module 83 to calculate time-synchronized data on the STO resistance (block 904). The resistance time-synchronized data saving module 82 stores time-synchronized data on the calculated resistance.

Now, specific arithmetic processing carried out by the time-synchronized calculator 81 will be described with reference to FIGS. 10A and 10B.

Figure 10A:
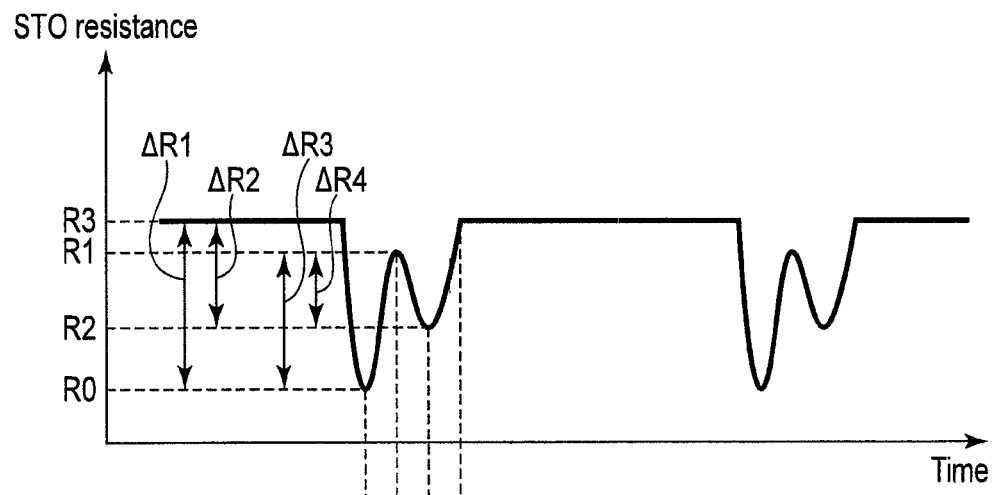
FIGS. 10A and 10B are diagrams showing an example of time axis data on an STO resistance according to the second embodiment.

FIG. 10A is a diagram showing the time-synchronized data on the resistance stored in the STO resistance time-synchronized data saving module 82, that is, a time axis-varying waveform of the STO resistance. FIG. 10B is a diagram showing the time axis data on the recording current (recording coil current) stored in the current time-axis data saving module 83, that is, the waveform of a current passed through the recording coils.

Figure 10B:
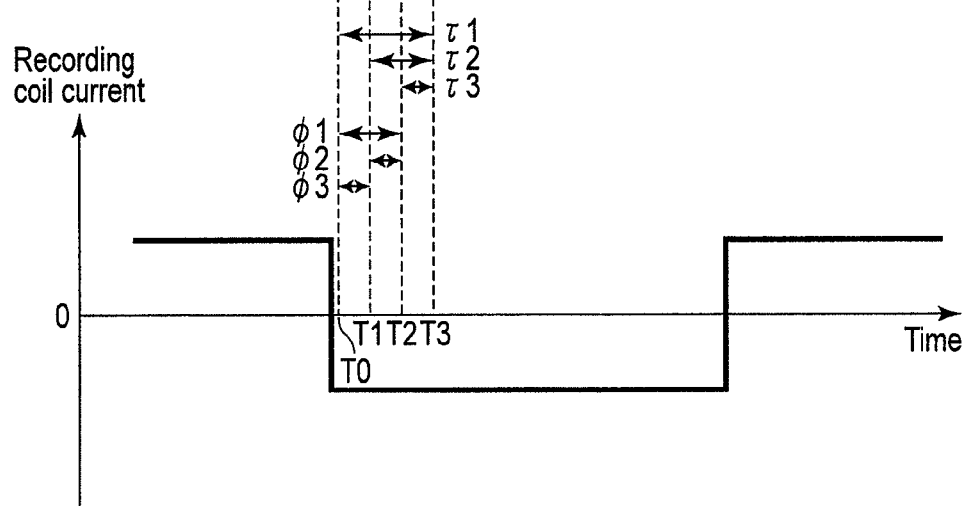

As shown in FIGS. 10A and 10B, at time T0 when the recording coil current has its polarity reversed, the STO has a minimum resistance R0. This is because, at time T0, magnetizations in a magnetic film in the STO 22 are arranged almost parallel to one another. The magnetic film in the STO 22 comprises a pinned layer and a free layer (oscillation layer) which are stacked, and has a resistance varying depending on the direction of the magnetization. Then, at time T1 when the magnetizations in the STO 22 are reversed in association with the reversal of polarity of the recording coil current, the STO exhibits a maximum resistance R1. At time T1, the magnetizations in the magnetic film in the STO 22 are almost anti-parallel to one another, with the resistance increased by the magnetoresistive effect (MR).

Moreover, at a time when the reversal of the magnetizations in the STO 22 ends, the STO exhibits a minimum resistance R2. This is because, at time T2, the magnetizations in the magnetic film in the STO 22 are almost parallel to one another, with the resistance of the STO reduced. Subsequently, the STO 22 oscillates to make the magnetizations in the magnetic film in the STO 22 almost anti-parallel to one another. Thus, the resistance is increased by the magnetoresistive effect. At time T3, the STO exhibits a saturated resistance R3.

As shown in FIG. 10A, the resistance time-synchronized calculator 81 calculates the oscillation intensity f of the STO 22 for each bit of the recorded data based on a time axis change $\Delta R1$ (R3−R0) or a time axis change $\Delta R2$ (R3−R2) in resistance. Here, as shown in FIG. 10B, each bit of the recorded data corresponds to the reversal of polarity of the recording coil current. The oscillation intensity f is calculated by an expression f=α1×ΔR1 or f=α2×ΔR2. In the expression, proportionality coefficients are denoted by α1 and α2.

Furthermore, the time-synchronized calculator 81 calculates the magnitude F of the magnetoresistive effect exerted when the magnetizations in the STO 22 are reversed at each bit of the recorded data, based on a time axis change ΔR3 (R1−R0) or a time axis change ΔR4 (R1−R2). In this case, F is calculated by an expression f=β1×ΔR1 or f=β2×ΔR2. In the expression, proportionality coefficients are denoted by β1 and β2.

Moreover, as shown in FIG. 10B, the time-synchronized calculator 81 calculates the amounts of oscillation response time τ1, τ2, and τ3 until the oscillation of the STO 22 is stabilized. The oscillation response time τ1 is a time (T3−T0) from time T0 corresponding to the minimum resistance of the STO until time T3 when the oscillation of the STO 22 is stabilized. The oscillation response time τ2 is a time (T3−T1) from time T1 corresponding to the maximum resistance of the STO until time T3, when the magnetizations in the STO 22 are reversed at each bit. The oscillation response time τ3 is a time (T3−T2) from time T2 when the reversal of the magnetizations in the STO 22 at each bit ends until time T3.

Furthermore, as shown in FIG. 10B, the time-synchronized calculator 81 calculates magnetization reversal times φ1, φ2, and φ3 for the STO 22. The magnetization reversal time φ1 is a time (T2−T0) from time T0 corresponding to the minimum resistance of the STO until time T2 of the end of magnetization reversal when the STO 22 exhibits the minimum resistance R2, as described above, before the magnetizations in the STO 22 are reversed at each bit. Moreover, the magnetization reversal time φ2 is a time (T2−T1) from time T1 corresponding to the maximum resistance of the STO until time T2 of the end of magnetization reversal when the STO 22 exhibits the minimum resistance R2, as described above, when the magnetizations in the STO 22 are reversed at each bit. The magnetization reversal time φ3 is a time (T1−T0) from time T0 corresponding to the minimum resistance of the STO until time T1 corresponding to the maximum resistance R1, as described above, before the magnetizations in the STO 22 are reversed at each bit.

Referring back to FIG. 9, the STO normality/abnormality decision module 42 compares the latest calculation result with an initial value for time-synchronized data on the resistance stored in the resistance time-synchronized data saving module 82 (block 905). The STO normality/abnormality decision module 42 checks whether or not the latest calculation result is equivalent to the initial value based on the comparison result (block 906). If the latest calculation result is equivalent to the initial value, the STO normality/abnormality decision module 42 determines the STO 22 to be normal (YES in block 906). Based on the determination result, the STO controller 43 performs current control to pass a current through the STO 22 (block 907). Moreover, the recording coil controller 44 performs current control to supply a recording current to the coils 23 and 24 (block 908). Hence, high-density magnetic recording is carried out on a disk 1 to apply a recording magnetic field and a high-frequency magnetic field to the disk 1.

On the other hand, if the latest calculation result deviates from the initial value, the STO normality/abnormality decision module 42 determines the STO 22 to be abnormal and malfunctioning (NO in block 906). Now, a process of determining whether or not the STO 22 is malfunctioning will be specifically described.

FIG. 11A shows a time axis-varying waveform of the STO resistance obtained in the case of degradation of oscillation intensity corresponding to the state of STO malfunction. FIG. 11B shows a time axis waveform of the recording coil current.

As shown in FIG. 11A, when the STO 22 starts to be damaged, a significant time axis change occurs in the STO resistance. That is, when the oscillation intensity of the STO 22 is degraded, the absolute values of ΔR1 and ΔR2 decrease uniformly for all the bits or for certain bits (arrow 1111). In this case, the latest calculation result 1112 deviates from an initial value 1110 of the oscillation intensity in a decreasing direction.

In such a case, in a first example of determination shown in FIG. 12, the STO normality/abnormality decision module 42 determines the STO to be malfunctioning if the average value of ΔR1 (or ΔR2) among all the inspected bits is smaller than the initial value by 50% (1200). Furthermore, in a second example of determination shown in FIG. 13, the STO normality/abnormality decision module 42 determines the STO to be malfunctioning if a variation in ΔR1 (or ΔR2) for each inspected bit is greater than the initial value by 50% (1300). Dotted lines in FIGS. 12 and 13 show allowable ranges.

FIG. 14A shows a time axis-varying waveform of the STO resistance obtained if the rate of a change in resistance (or the degree of a change in resistance) caused by the magnetoresistive effect (MR) is degraded in association with the state of STO malfunction. FIG. 14 shows a time axis waveform of the recording coil current.

As shown in FIG. 14A, when the STO 22 starts to be damaged, a significant time axis change occurs in the STO resistance. That is, when the magnetoresistive effect, which is also an indicator for membrane quality, is degraded, the absolute values of ΔR3 and ΔR4 decrease uniformly for all the bits or for certain bits (arrow 1111). In this case, the latest calculation result 1112 deviates from the initial value 1110 in a decreasing direction. This is because when the magnetizations in the STO are reversed in association with the reversal of polarity of the recording coil current, an increase in resistance is reduced by the magnetoresistive effect.

Figure 15:
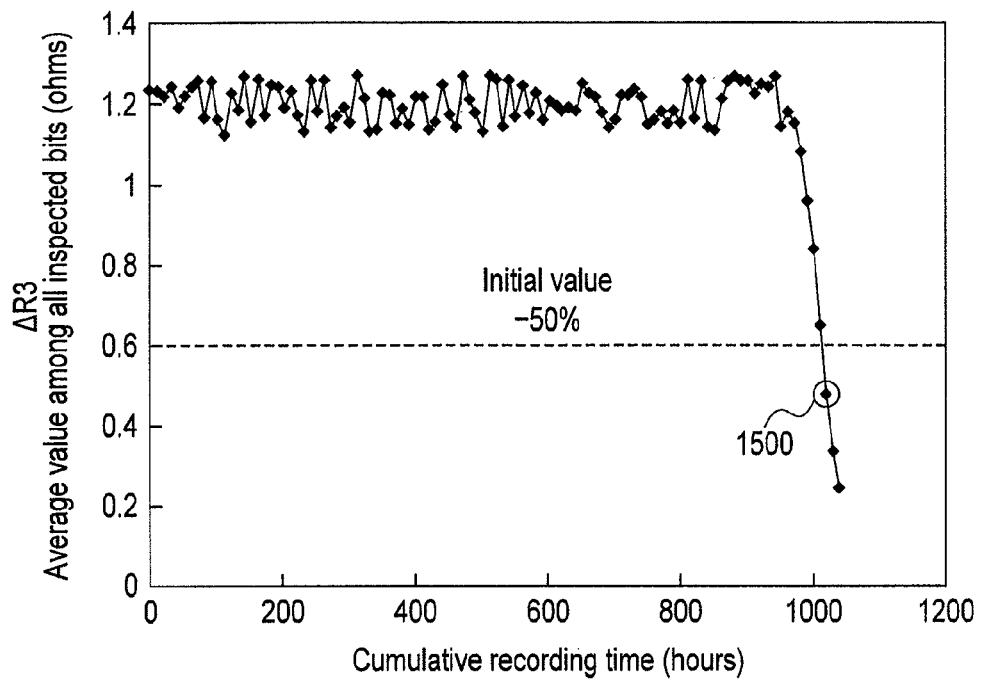
FIG. 15 is a diagram illustrating a third example of determination for STO malfunction according to the second embodiment.
Figure 16:
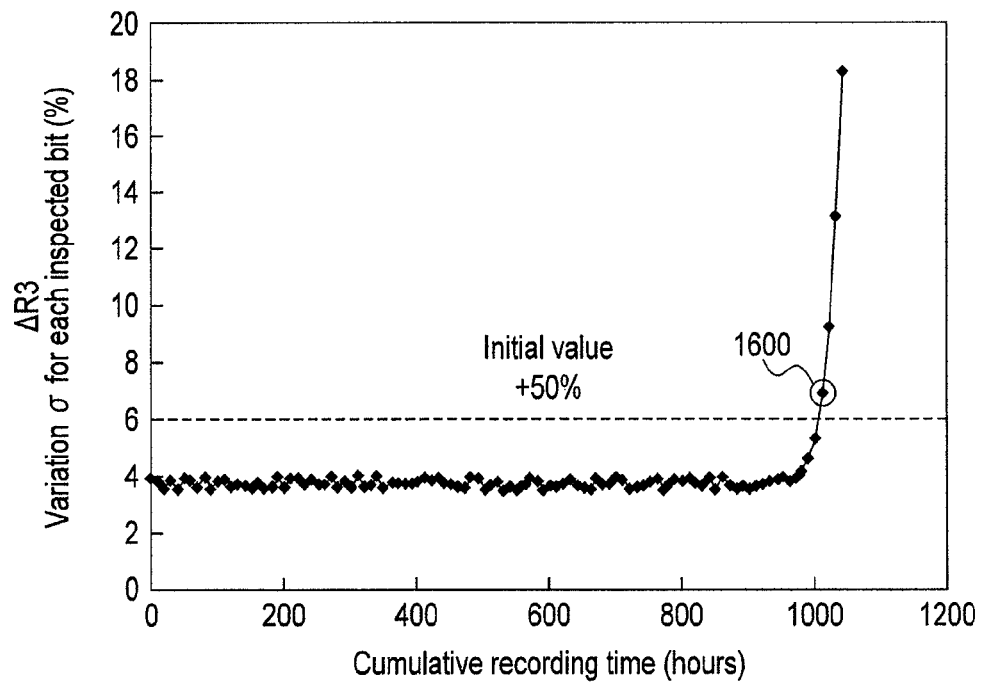
FIG. 16 is a diagram illustrating a fourth example of determination for STO malfunction according to the second embodiment.

In such a case, in a third example of determination shown in FIG. 15, the STO normality/abnormality decision module 42 determines the STO to be malfunctioning if the average value of ΔR3 (or ΔR4) among all the inspected bits is smaller than the initial value by 50% (1500). Furthermore, in a fourth example of determination shown in FIG. 16, the STO normality/abnormality decision module 42 determines the STO to be malfunctioning if a variation in ΔR3 (or ΔR4) for each inspected bit is greater than the initial value by 50% (1600). Dotted lines in FIGS. 15 and 16 show allowable ranges.

FIG. 17A shows a case of degradation of oscillation responsiveness (time τ) corresponding to STO malfunction. FIG. 17B shows a time axis waveform of the recording coil current.

As shown in FIG. 17A, when the STO 22 starts to be damaged, a significant time axis change occurs in the STO resistance. That is, when the responsiveness of the STO 22 is degraded before the oscillation of the STO 22 is stabilized, oscillation response times τ1, τ2, and τ3 increase uniformly for all the bits or for certain bits (arrow 1703). In this case, the latest calculation result 1701 deviates from an initial value 1700 in an increasing direction.

Figure 18:
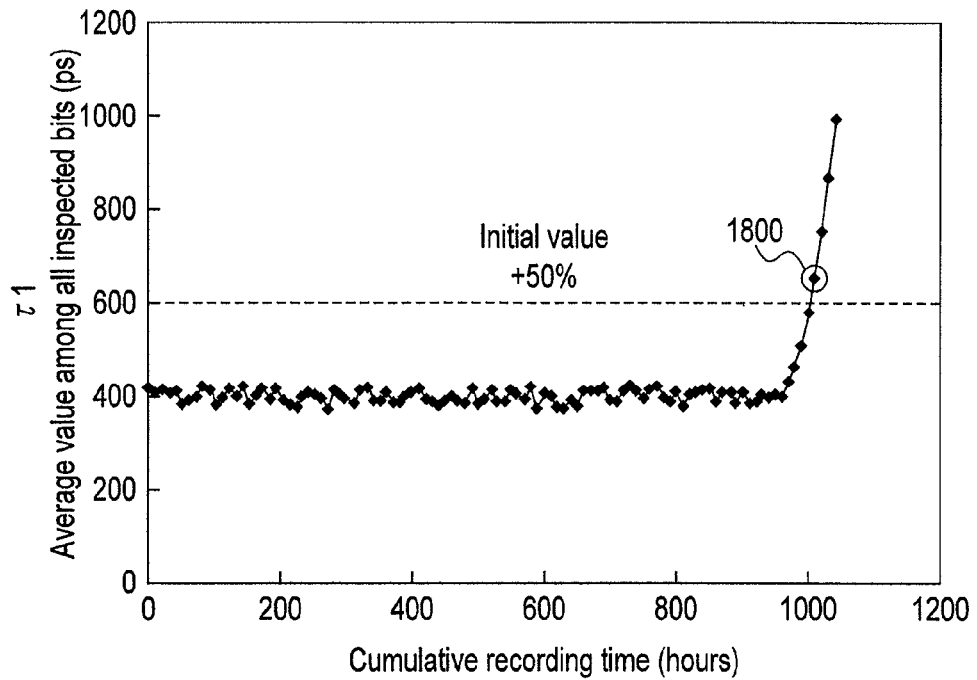
FIG. 18 is a diagram illustrating a fifth example of determination for STO malfunction according to the second embodiment.
Figure 19:
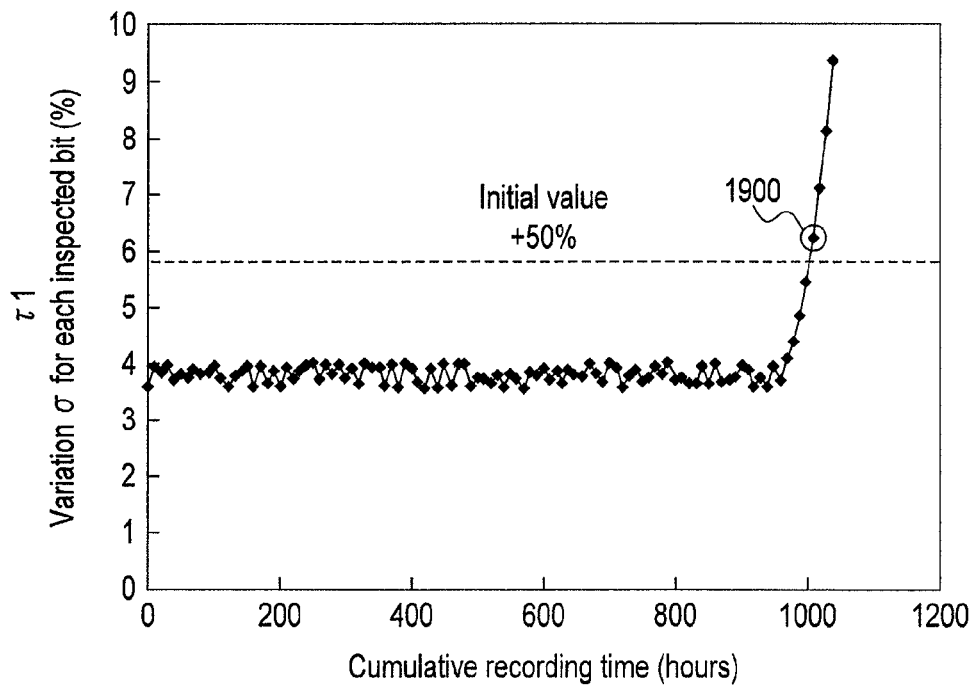
FIG. 19 is a diagram illustrating a sixth example of determination for STO malfunction according to the second embodiment.

In such a case, in a fifth example of determination shown in FIG. 18, the STO normality/abnormality decision module 42 determines the STO to be malfunctioning if the average value of the oscillation response time τ1 (or τ2 or τ3) among all the inspected bits is smaller than the initial value by 50% (1800). Furthermore, in a sixth example of determination shown in FIG. 19, the STO normality/abnormality decision module 42 determines the STO to be malfunctioning if a variation in τ1 (or τ2 or τ3) for each inspected bit is greater than the initial value by 50% (1900). Dotted lines in FIGS. 18 and 19 show allowable ranges.

Figure 20A:
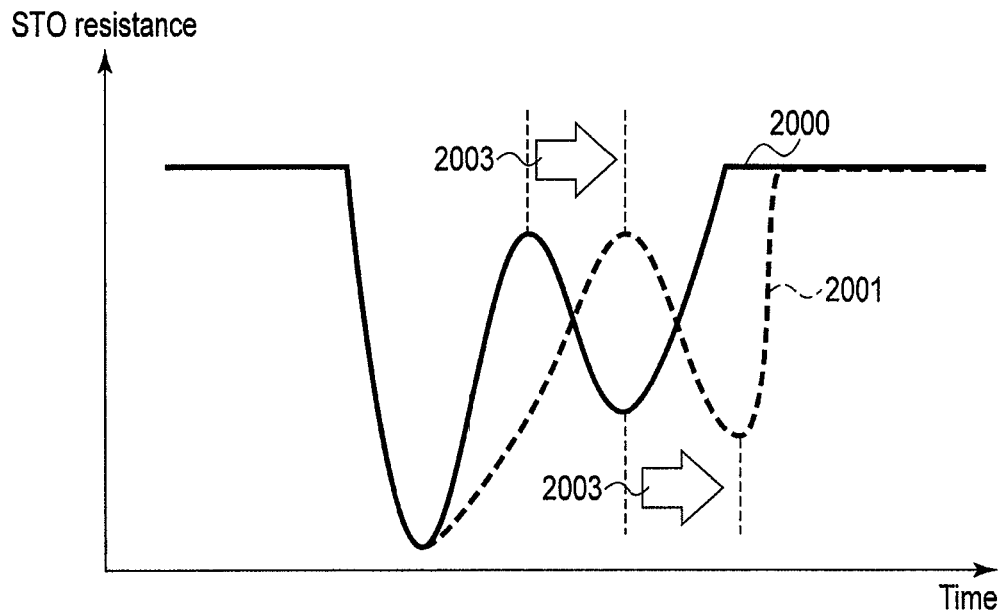
FIGS. 20A and 20B are diagrams illustrating degradation of a magnetization reversal speed corresponding to the state of STO malfunction according to the second embodiment.
Figure 20B:
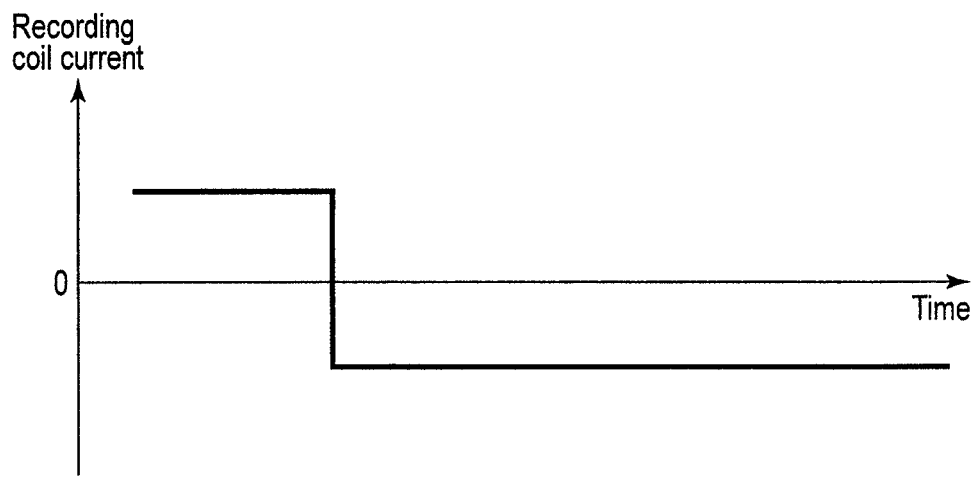

FIG. 20A shows a case of degradation of a magnetization reversal speed p corresponding to STO malfunction. FIG. 20B shows a time axis waveform of the recording coil current.

As shown in FIG. 20A, when the STO 22 starts to be damaged, a significant time axis change occurs in the STO resistance. That is, when the magnetization reversal speed decreases (degraded) in association with the reversal of polarity of the recording coil current, magnetization reversal times φ1, φ2, and φ3 increase uniformly for all the bits or for certain bits (arrow 2003). In this case, the latest calculation result 2001 deviates from an initial value 2000 in an increasing direction.

In such a case, in a seventh example of determination shown in FIG. 21, the STO normality/abnormality decision module 42 determines the STO to be malfunctioning if the average value of the oscillation reversal time φ1 (or φ2 or φ3) among all the inspected bits is greater than the initial value by 50% (2100). Furthermore, in an eighth example of determination shown in FIG. 22, the STO normality/abnormality decision module 42 determines the STO to be malfunctioning if a variation in φ1 (or φ2 or φ3) for each inspected bit is greater than the initial value by 50% (2200). Dotted lines in FIGS. 21 and 22 show allowable ranges.

Referring back to FIG. 9, the STO normality/abnormality decision module 42, upon determining the STO 22 to be malfunctioning, outputs an operation off command to the STO controller 43 (block 909) as described above. At the same time, the STO normality/abnormality decision module 42 outputs an operation off command to the recording coil controller 44 (block 1000). Moreover, the STO normality/abnormality decision module 42 outputs an operation on command to a head driver 45 and a reproduction signal detector 46 (block 1001). Thus, the reproduction signal detector 46 reproduces recorded data from the disk surface over which the head 10 is traveling, and stores the reproduced data in a memory 17 via a reproduction signal saving module 47.

Subsequently, the STO normality/abnormality decision module 62 outputs a recording operation on command to an STO controller 63 and a recording coil controller 64 in the head 50 (block 1002). Thus, the STO controller 63 performs current control to pass a current through the STO 22 in the head 50 (block 1003). Moreover, the recording coil controller 64 performs current control to supply a recording current to the coils 23 and 24 in the head 50 (block 1004). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The second embodiment configured as described above can also exert effects similar to the effects of the above-described first embodiment.

Third Embodiment

FIG. 23 is a block diagram showing a configuration that implements recording and reproduction control for a head according to a third embodiment. As is the case with the first embodiment, heads 10 and 50 are mounted in the same actuator 3, and the same configuration performs the recording and reproduction control on both the heads 10 and 50. However, for convenience, a configuration for carrying out the functions of the recording and reproduction control on each of the heads 10 and 50 is illustrated. Components of the third embodiment which are similar to the corresponding components of the second embodiment shown in FIG. 8 are denoted by the same reference numbers and will not be described below.

As shown in FIG. 23, the present embodiment connects low-pass filters 200 and 300 to outputs of STO resistance detectors 40 and 60, respectively, which detect the resistance of an STO 22. The low-pass filters 200 and 300 have cutoff frequencies controlled by cutoff frequency controllers 201 and 301, respectively. As described below, the cutoff frequency controllers 201 and 301 control the cutoff frequencies so that the cutoff frequencies are at least double the frequencies of inspection signals output by inspection low-frequency signal generators (hereinafter referred to as low-frequency signal generators) 44C and 64C included in recording coil controllers 44 and 64, respectively.

Here, the recording coil controller 44 includes a recording signal pattern controller 44A, a recording current controller 44B, and a low-frequency signal generator 44C as shown in FIG. 24A. Similarly, the recording coil controller 64 includes a recording signal pattern controller 64A, a recording current controller 64B, and a low-frequency signal generator 64C as shown in FIG. 24B.

The operation of the recording and reproduction control according to the present embodiment will be described below with reference to a flowchart in FIG. 25.

Figure 25:
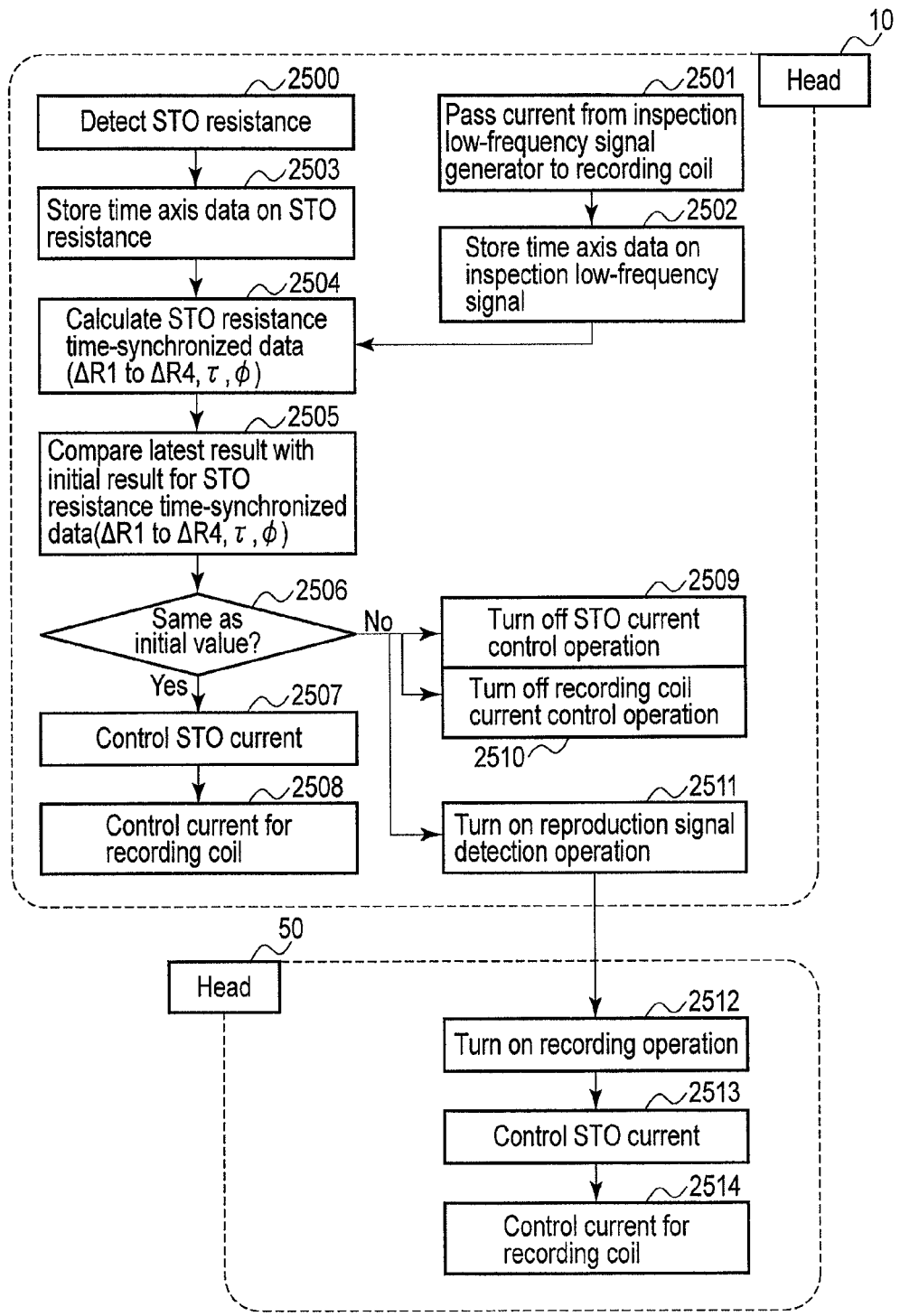
FIG. 25 is a flowchart illustrating an operation of the recording and reproduction control according to the third embodiment.

As shown in FIG. 25, the STO resistance detector 40 in the head 10 detects the electrical resistance of the STO 22 (block 2500). A resistance time axis data saving module 80 stores time axis data on the detected resistance of the STO 22 (block 2503). Furthermore, the recording coil controller 44 allows the low-frequency signal generator 44c to supply a current for an inspection low-frequency signal to the coils 23 and 24 in the head 10 (block 2501). A current time-axis data saving module 83 stores time axis data on the inspection low-frequency signal (block 2502).

A time-synchronized calculator 81 uses the time axis data on the resistance stored in the resistance time axis data saving module 80 and the time axis data on the inspection low-frequency signal stored in the current time-axis data saving module 83 to calculate time-synchronized data on the STO resistance (block 2504). A resistance time-synchronized data saving module 82 stores time-synchronized data on the calculated resistance.

Now, arithmetic processing carried out by the STO resistance time-synchronized calculator 81 will be described with reference to FIGS. 26A and 26B as well as FIGS. 27A and 27B.

FIG. 26A is a diagram showing time-synchronized data on the STO resistance, that is, a time axis-varying waveform of the STO resistance, obtained if, during an STO inspection, the recording coil controller 44 supplies a recording coil current for normal data recording to the recording coils. Furthermore, FIG. 26B is a diagram showing time axis data on a recording current (recording coil current), that is, the waveform of a current passed through the recording coils.

As shown in FIG. 26B, for normal data recording, the recording coil controller 44 supplies the recording coils with a recording current having a high frequency and an intensity that changes significantly in the vicinity of magnetization reversal. In this case, in the STO 22, when the magnetizations are reversed in the vicinity of the reversal of polarity of the recording coil current, the magnetizations in the membrane changes from a parallel state through an anti-parallel state to the parallel state. Thereafter, the STO 22 oscillates to preclude the parallel magnetizations in the membrane from being changed into a different aligned state, and thus the process of changes in resistance caused by the magnetoresistive effect (MR) occurs in a very short time. Thus, as shown in FIG. 26A, it is difficult to observing changes 2600 in STO resistance, that is, the resistances R0 to R3, at times T0 to T3 on the time axis as described above. As a result, the time-synchronized calculator 81 may fail to correctly calculate time-synchronized data on the STO resistance such as time axis changes $\Delta R1$ and $\Delta R2$ in resistance, time axis changes $\Delta R3$ and $\Delta R4$ in resistance, oscillation response times $\tau 1$, $\tau 2$, and $\tau 3$, and magnetization reversal times $\phi 1$, $\phi 2$, and $\phi 3$, as described above.

On the other hand, FIG. 27A is a diagram showing time-synchronized data on the STO resistance, that is, a time axis-varying waveform of the STO resistance, obtained if, during an STO inspection, a low-frequency generator 44C supplies an inspection low-frequency signal to the recording coils. Furthermore, FIG. 27B is a diagram showing time axis data on the recording current (recording coil current), that is, the waveform of a current passed through the recording coils.

As shown in FIG. 27B, the low-frequency generator 44C supplies a current with an intensity change of about 5 A/s or less in the vicinity of magnetization reversal to the recording coils via an inspection low-frequency signal with a frequency of, for example, 1 kHz or less. The inspection low-frequency signal has a band smaller than the band of a data recording signal. In this case, when the magnetizations in the STO 22 are reversed in the vicinity of the reversal of polarity of the recording coil current, the magnetizations in the membrane change from the parallel state through the anti-parallel state to the parallel state, and then changes in resistance caused by the magnetoresistive effect occur at long time intervals.

Thus, as shown in FIG. 27A, changes in STO resistance R0 to R3 at times T0 to T3 on the time axis as described above can be accurately observed. That is, the time-synchronized calculator 81 can correctly calculate the time-synchronized data on the STO resistance such as the time axis changes $\Delta R1$ and $\Delta R2$ in resistance, the time axis changes $\Delta R3$ and $\Delta R4$ in resistance, the oscillation response times $\tau 1$, $\tau 2$, and $\tau 3$, and the magnetization reversal times $\phi 1$, $\phi 2$, and $\phi 3$, as described above.

Referring back to FIG. 25, an STO normality/abnormality decision module 42 compares the latest calculation result with an initial value for time-synchronized data on the resistance stored in the resistance time-synchronized data saving module 82 (block 2505). The initial value is also obtained by recording the inspection low-frequency signal. The STO normality/abnormality decision module 42 checks whether or not the latest calculation result is equivalent to the initial value based on the comparison result (block 2506). If the latest calculation result is equivalent to the initial value, the STO normality/abnormality decision module 42 determines the STO 22 to be normal (YES in block 2506). Based on the determination result, an STO controller 43 performs current control to pass a current through the STO 22 (block 2507). Moreover, a recording coil controller 44 performs current control to supply a recording current to the coils 23 and 24 (block 2508). Hence, high-density magnetic recording is carried out on a disk 1 to apply a recording magnetic field and a high-frequency magnetic field to the disk 1.

On the other hand, if the latest calculation result deviates from the initial value, the STO normality/abnormality decision module 42 determines the STO 22 to be abnormal and malfunctioning (NO in block 2506). Here, a process of determining whether or not the STO 22 is malfunctioning is similar to the process described above in the second embodiment. Upon determining the STO 22 to be malfunctioning, the STO normality/abnormality decision module 42 outputs an operation off command to the STO controller 43 (block 2509) as described above. At the same time, the STO normality/abnormality decision module 42 outputs an operation off command to the recording coil controller 44 (block 2510). Moreover, the STO normality/abnormality decision module 42 outputs an operation on command to a head driver 45 and reproduction signal detector 46 (block 2511). Thus, the reproduction signal detector 46 reproduces recorded data from the disk surface over which the head 10 is traveling, and stores the reproduced data in a memory 17 via a reproduction signal saving module 47.

Subsequently, the STO normality/abnormality decision module 62 outputs a recording operation on command to an STO controller 63 and a recording coil controller 64 in the head 50 (block 2512). Thus, the STO controller 63 performs current control to pass a current through the STO 22 in the head 50 (block 2513). Moreover, the recording coil controller 64 performs current control to supply a recording current to the coils 23 and 24 in the head 50 (block 2514). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The third embodiment configured as described above can also exert effects similar to the effects of the above-described first embodiment.

Fourth Embodiment

FIG. 28 is a block diagram showing a configuration that implements recording and reproduction control for a head according to a fourth embodiment. As is the case with the first embodiment, heads 10 and 50 are mounted in the same actuator 3, and the same configuration performs the recording and reproduction control on both the heads 10 and 50. However, for convenience, a configuration for carrying out the functions of the recording and reproduction control on each of the heads 10 and 50 is illustrated. Components of the fourth embodiment which are similar to the corresponding components of the second embodiment shown in FIG. 8 are denoted by the same reference numbers and will not be described below.

As shown in FIG. 28, the present embodiment connects band-pass filters 400 and 500 to outputs of STO resistance detectors 40 and 60, respectively, which detect the resistance of an STO 22. The band-pass filters 400 and 500 have passbands controlled by passband controllers 401 and 501, respectively. As described below, the passband controllers 401 and 501 control the cutoff frequencies so that the passbands are arranged in the vicinity of the frequencies of recording signals output by recording pattern signal controllers 44A and 64A included in recording coil controllers 44 and 64.

Here, as shown in FIG. 29A, the rerecording coil controller 44 includes a recording signal pattern controller 44A and a recording current controller 44B. The recording signal pattern controller 44A outputs frequency data on a recording coil current to the passband controller 401 and a recording coil current frequency data saving module (hereinafter referred to as a frequency data saving module) 402. The frequency data saving module 402 stores the frequency data. Similarly, as shown in FIG. 29B, the rerecording coil controller 64 includes a recording signal pattern controller 64A and a recording current controller 64B. The recording signal pattern controller 64A outputs frequency data on the recording coil current to the passband controller 501 and a frequency data saving module 502. The frequency data saving module 502 stores the frequency data.

Moreover, as shown in FIG. 28, STO oscillation intensity responsiveness calculators (hereinafter referred to as a responsiveness calculators) 403 and 503 calculate oscillation intensity responsiveness data on the STO based on the frequency data on the recording coil current stored in the frequency data saving modules 402 and 502, respectively. STO oscillation intensity responsiveness data saving modules (hereinafter referred to as responsiveness data saving modules) 404 and 504 store the calculated oscillation intensity responsiveness on the STO. STO normality/abnormality decision modules 42 and 62 determine whether or not the STO 22 is abnormal (defective or degraded) based on the oscillation intensity responsiveness data stored in the responsiveness data saving modules 404 and 504.

The operation of the recording and reproduction control according to the present embodiment according to the present embodiment will be described below with reference to a flowchart in FIG. 30.

Figure 30:
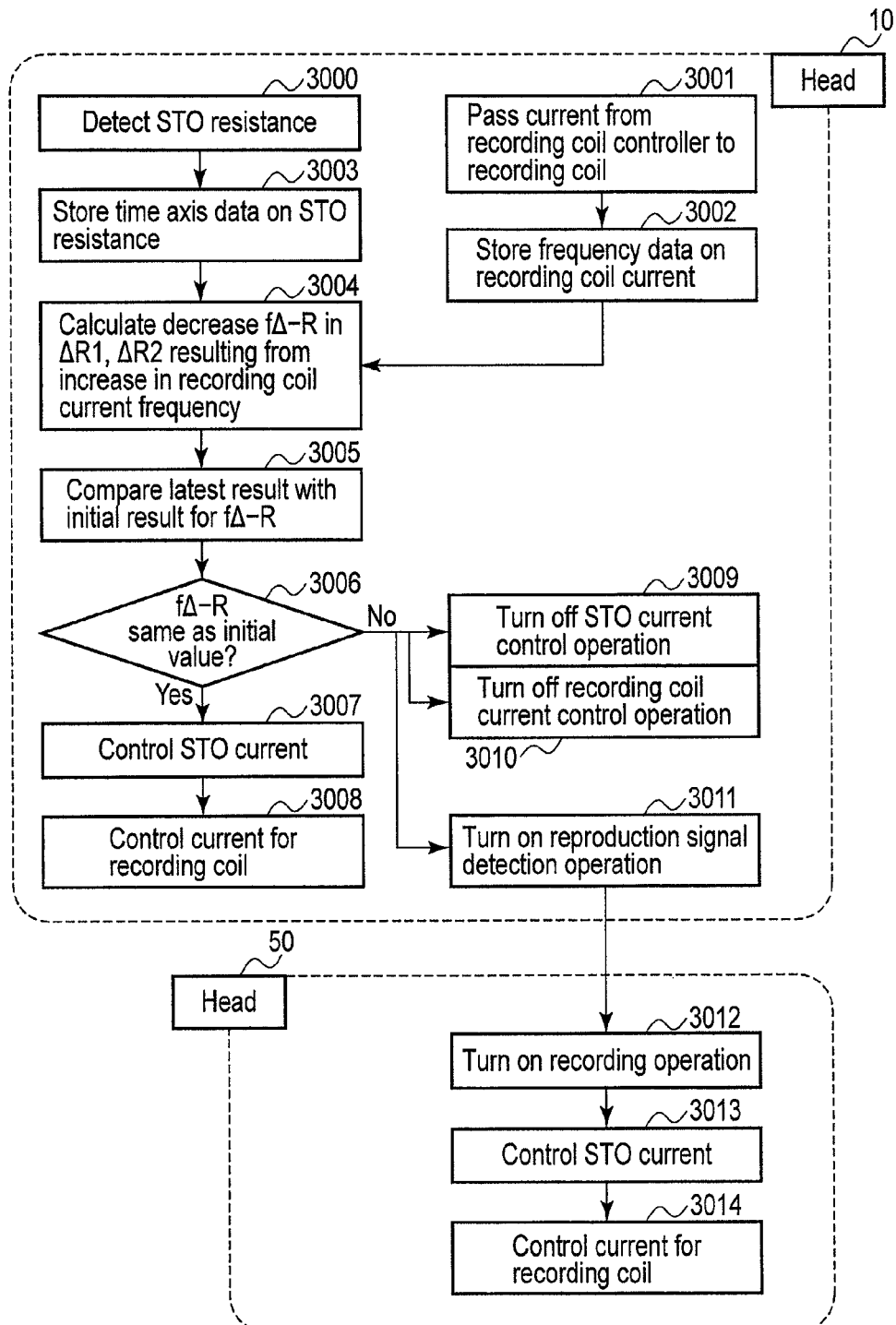
FIG. 30 is a flowchart illustrating an operation of the recording and reproduction control according to the fourth embodiment.

As shown in FIG. 30, the STO resistance detector 40 in the head 10 detects the electrical resistance of the STO 22 (block 3000). A resistance time axis data saving module 80 stores time axis data on the detected resistance of the STO 22 (block 3003). Furthermore, the recording coil controller 44 allows the recording current controller 44B to supply the recording coil current to the coils 23 and 24 in the head 10 (block 3001). At this time, the frequency data saving module 502 stores frequency data on the recording coil current output by the recording signal pattern controller 44A (block 3002).

The responsiveness calculator 403 uses time-synchronized data on the resistance stored in a resistance time-synchronized data saving module 82 and the frequency data on the recording coil current stored in the frequency data saving module 402 to calculate oscillation intensity responsiveness data on the STO (block 3004). The responsiveness data saving module 404 stores the calculated oscillation intensity responsiveness data on the STO.

Now, arithmetic processing carried out by the responsiveness calculator 403 will be described with reference to FIGS. 31A and 31B. FIG. 31A shows a time axis-varying waveform of the STO resistance obtained in the case of degradation of the oscillation responsiveness corresponding to the state of STO malfunction. FIG. 31B shows a time axis waveform of the recording coil current.

If the recording coil current has a high frequency equal to or higher than the maximum frequency, degraded oscillation responsiveness of the STO 22 may preclude the recording coil current frequency from being followed. Thus, as shown in FIG. 31A, the absolute values of $\Delta R1$ and $\Delta R2$ sharply decrease uniformly for all the bits or for certain bits (3102). In this case, if the oscillation responsiveness of the STO is normal, the initial values 3101 of $\Delta R1$ and $\Delta R2$ are sufficiently large. When the oscillation responsiveness of the STO is degraded, the bit switches to the next bit before a stable oscillation state is established. This reduces the values of $\Delta R1$ and $\Delta R2$ (arrow 3100).

FIG. 32 shows a first example of an indicator indicative of the oscillation responsiveness of the STO. That is, as shown in FIG. 32, the first example of the indicator indicative of the oscillation responsiveness of the STO is, for example, a value for the dependence of the recording coil current frequency on the average value of $\Delta R1$ ($\Delta R2$) among all the inspected bits. Specifically, the responsiveness calculator 403 calculates the difference f–$\Delta R$ between $\Delta R1$ or $\Delta R2$ at a certain high frequency foh and a $\Delta R1$ or $\Delta R2$ at a certain low frequency fol to obtain oscillation intensity responsiveness data on the STO.

Referring back to FIG. 30, the STO normality/abnormality decision module 42 compares the latest calculation result with an initial value for the oscillation intensity responsiveness data (f–$\Delta R$) on the STO stored in the responsiveness data saving module 404 (block 3005). The STO normality/abnormality decision module 42 checks whether or not the latest calculation result is equivalent to the initial value based on the comparison result (block 3006). If the latest calculation result is equivalent to the initial value, the STO normality/abnormality decision module 42 determines the STO 22 to be normal (YES in block 3006). Based on the determination result, an STO controller 43 performs current control to pass a current through the STO 22 (block 3007). Moreover, a recording coil controller 44 performs current control to supply a recording current to the coils 23 and 24 (block 3008). Hence, high-density magnetic recording is carried out on a disk 1 to apply a recording magnetic field and a high-frequency magnetic field to the disk 1.

On the other hand, if the latest calculation result deviates from the initial value, the STO normality/abnormality decision module 42 determines the STO 22 to be abnormal and malfunctioning (NO in block 3006). That is, in a first example of an indicator shown in FIG. 32, the STO normality/abnormality decision module 42 determines the responsiveness of the STO to be degraded to determine the STO to be malfunctioning if the latest calculation result f–$\Delta R$ is greater than the initial value by 50% (3300), as shown in FIG. 33 as a first example of determination.

Figure 34:
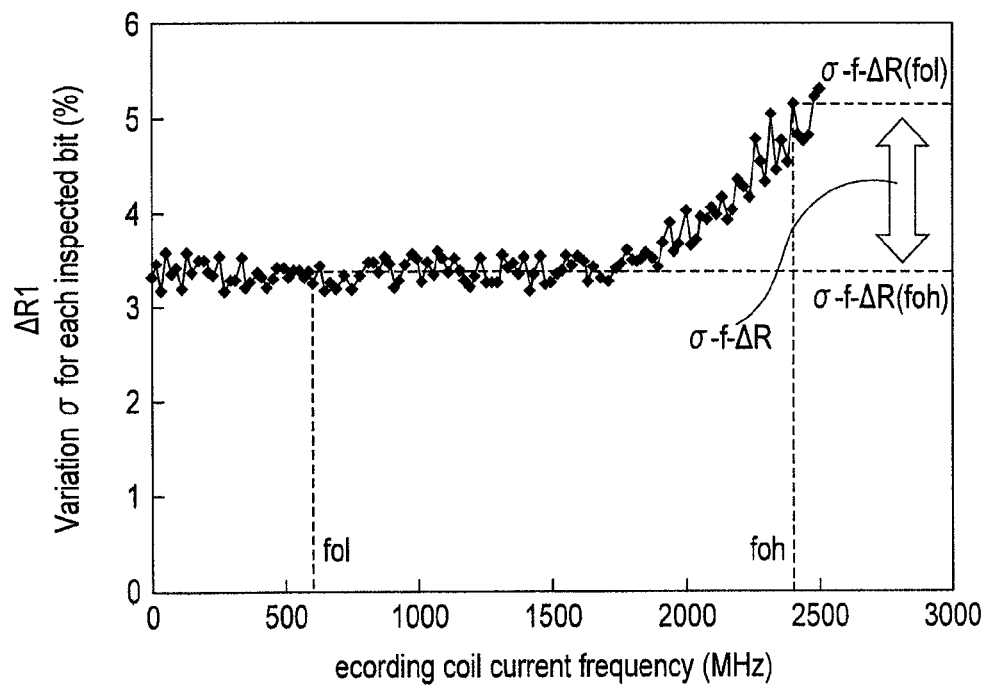
FIG. 34 is a diagram illustrating a second example of an indicator for oscillation responsiveness according to the fourth embodiment.
Figure 35:
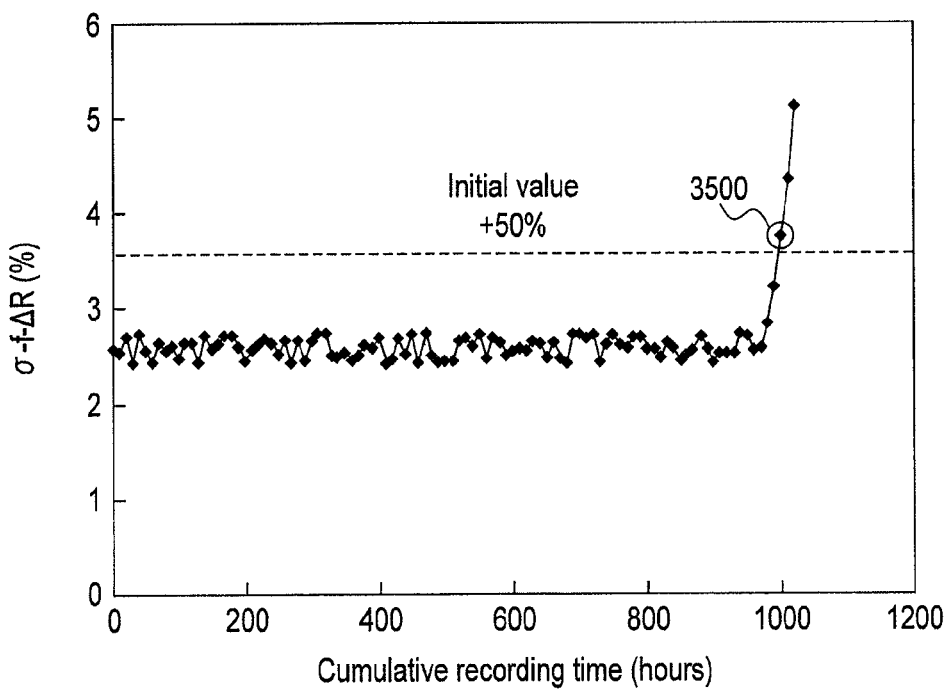
FIG. 35 is a diagram illustrating a second example of determination for oscillation responsiveness according to the fourth embodiment.

Furthermore, FIG. 34 shows a second example of the indicator indicative of the oscillation responsiveness of the STO. That is, as shown in FIG. 34, the second example of the indicator indicative of the oscillation responsiveness of the STO is, for example, a value for the dependence of the recording coil current frequency on, for example, a variation in $\Delta R1$ ($\Delta R2$) for each inspected bit. Specifically, the responsiveness calculator 403 calculates the difference σ–f–$\Delta R$ between σ of $\Delta R1$ or $\Delta R2$ at the certain high frequency foh and σ of $\Delta R1$ or $\Delta R2$ at the certain low frequency fol to obtain oscillation intensity responsiveness data on the STO.

Thus, in a second example of the indicator shown in FIG. 34, the STO normality/abnormality decision module 42 determines the responsiveness of the STO to be degraded to determine the STO to be malfunctioning if the latest calculation result σ–f–ΔR is greater than the initial value by 50% (3500).

Referring back to FIG. 30, upon determining the STO 22 to be malfunctioning, the STO normality/abnormality decision module 42 outputs an operation off command to the STO controller 43 (block 3009) as described above. At the same time, the STO normality/abnormality decision module 42 outputs an operation off command to the recording coil controller 44 (block 3010). Moreover, the STO normality/abnormality decision module 42 outputs an operation on command to a head driver 45 and a reproduction signal detector 46 (block 3011). Thus, the reproduction signal detector 46 reproduces recorded data from the disk surface over which the head 10 is traveling, and stores the reproduced data in a memory 17 via a reproduction signal saving module 47.

Subsequently, the STO normality/abnormality decision module 62 outputs a recording operation on command to an STO controller 63 and a recording coil controller 64 in the head 50 (block 3012). Thus, the STO controller 63 performs current control to pass a current through the STO 22 in the head 50 (block 3013). Moreover, the recording coil controller 64 performs current control to supply a recording current to the coils 23 and 24 in the head 50 (block 3014). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The fourth embodiment configured as described above can also exert effects similar to the effects of the above-described first embodiment.

Fifth Embodiment

Figure 36:
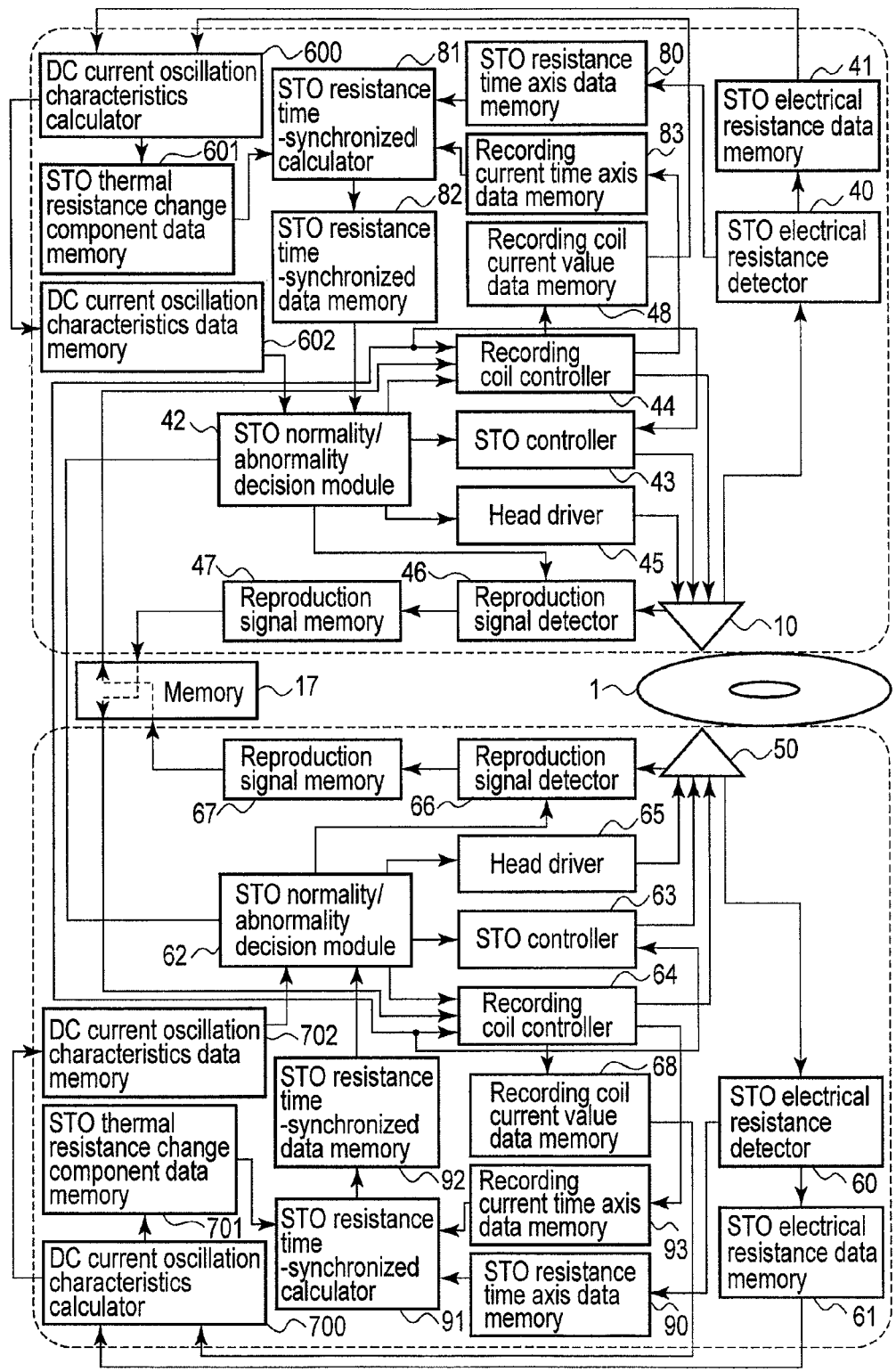
FIG. 36 is a block diagram showing a functional configuration that implements recording and reproduction control according to a fifth embodiment.

FIG. 36 is a block diagram showing a configuration that implements recording and reproduction control for a head according to a fifth embodiment. As is the case with the first embodiment, heads 10 and 50 are mounted in the same actuator 3, and the same configuration performs the recording and reproduction control on both the heads 10 and 50. However, for convenience, a configuration for carrying out the functions of the recording and reproduction control on each of the heads 10 and 50 is illustrated. Components of the fifth embodiment which are similar to the corresponding components of the second embodiment shown in FIG. 8 are denoted by the same reference numbers and will not be described below.

As shown in FIG. 36, according to the present embodiment, a resistance data saving module 41, 61 sequentially stores resistance data on an STO 22 detected by an STO resistance detector 40, 60. A DC current oscillation characteristics calculator (hereinafter referred to as an oscillation characteristics calculator) 600, 700 calculates DC current oscillation characteristics data based on resistance data on the STO 22 stored in the resistance data saving module 41, 61 and recording coil current data stored in a recording coil current data saving module (hereinafter referred to as a current data saving module) 48, 68. The current data saving module 48, 68 stores data on the value of a recording coil current supplied to the recording coils by a recording coil controller 44, 64.

A DC current oscillation characteristics data saving module (hereinafter referred to as an oscillation characteristics data saving module) 602, 702 stores the calculated DC current oscillation characteristics data. An STO thermal resistance change component data saving module (hereinafter referred to as a change component data saving module) 601, 701 stores thermal resistance change component data obtained by correcting an STO thermal resistance change component of the calculated DC current oscillation characteristics data. An STO normality/abnormality decision module 42, 62 determines whether the STO is normal or abnormal based on time-synchronized data on the resistance stored in a resistance data saving module 82, 92 and the DC current oscillation characteristics data stored in the oscillation characteristics data saving module 602, 702.

Now, the operation of the recording and reproduction control according to the present embodiment will be described below with reference to a flowchart in FIG. 37.

Figure 37:
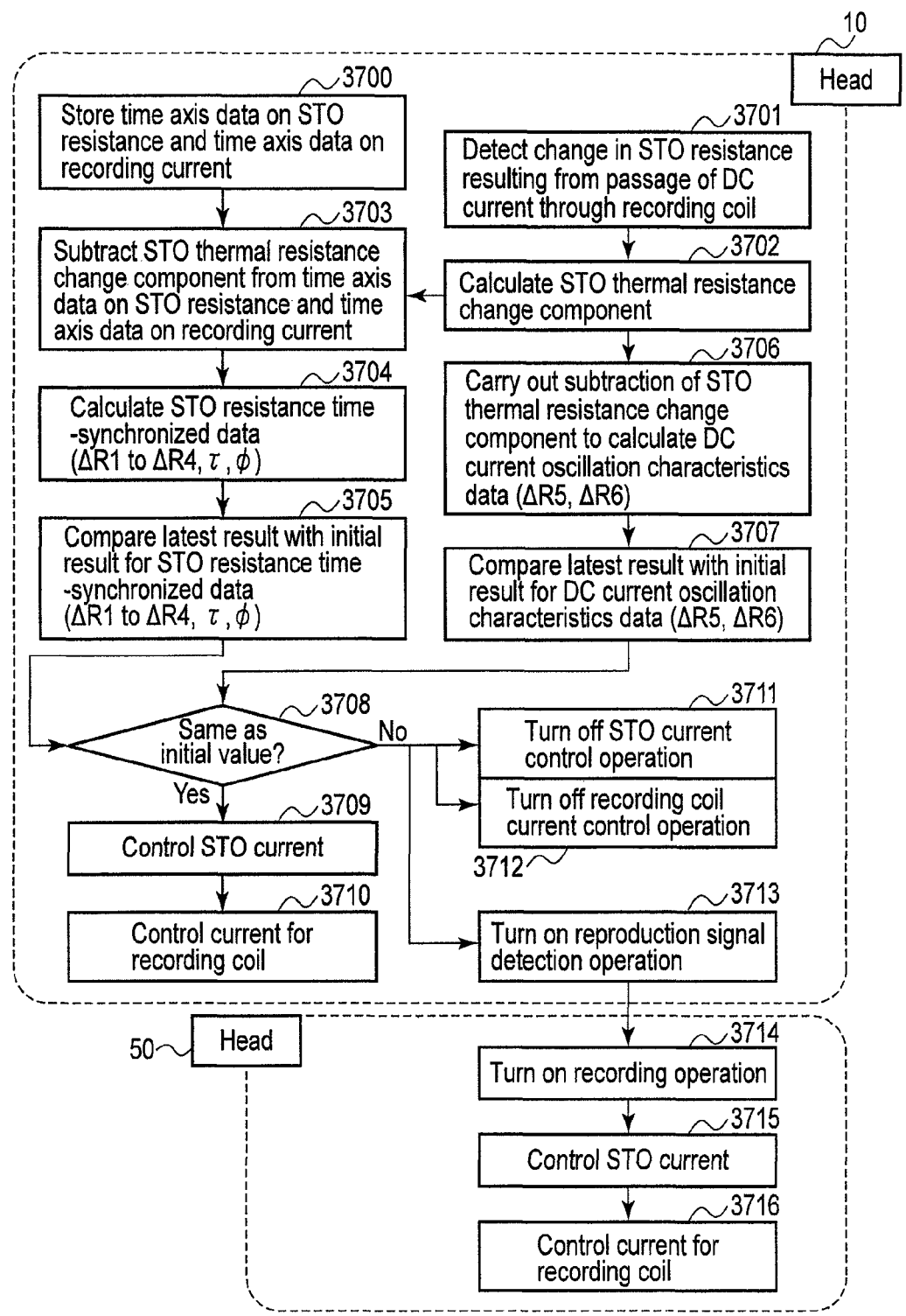
FIG. 37 is a flowchart illustrating an operation of the recording and reproduction control according to the fifth embodiment.

As shown in FIG. 37, a resistance time axis data saving module 80 stores time axis data on the resistance of the STO 22 detected by the STO resistance detector 40 (block 3700). Furthermore, a current time-axis data saving module 83 stores time axis data on the recording coil current supplied by a recording coil controller 44.

The oscillation characteristics calculator 600 calculates a resistance change for the STO 22 based on the recording coil current data (block 3701). The oscillation characteristics calculator 600 also corrects the STO thermal resistance change component of the calculated resistance change of the STO 22 to calculate thermal resistance change component data (block 3702).

Here, with reference to FIGS. 38 and 39, examples of a process of correcting the adverse effect of the STO thermal resistance and calculation of DC current oscillation characteristics will be described in connection with arithmetic processing carried out by the oscillation characteristics calculator 600.

Figure 38:
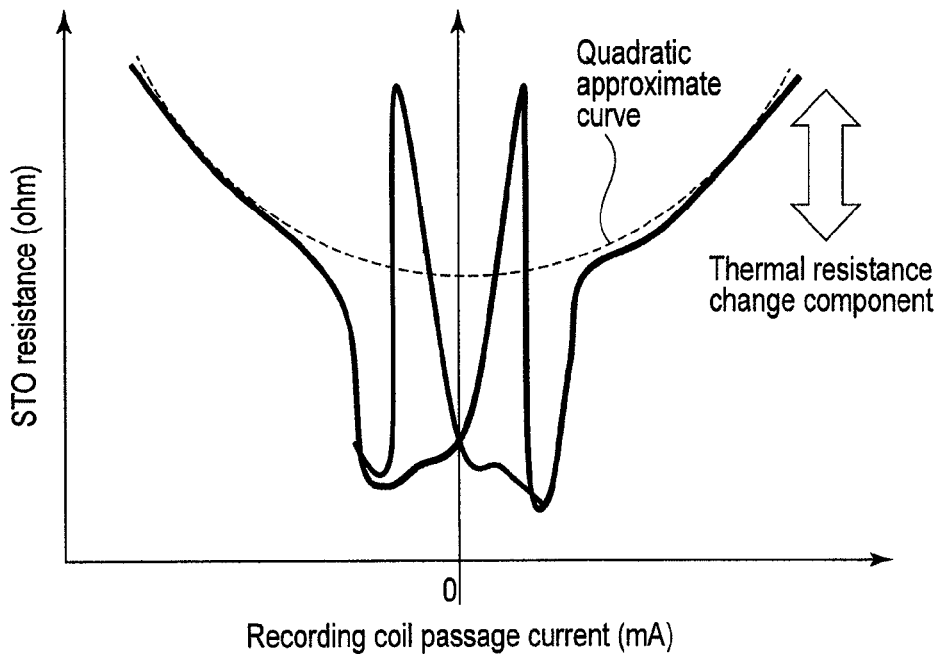
FIG. 38 is a diagram showing a variation in an STO resistance in association with a variation in a recording coil DC current according to the fifth embodiment.

FIG. 38 shows a variation in the resistance of the STO 22 in association with a variation in DC current passed through the recording coils by a recording coil controller 44. As shown in FIG. 38, the STO resistance increases as a result of the impact of generated heat, consistently with the absolute value of a DC current through the recording coils. At this time, the DC current oscillation characteristics calculator 600, for example, calculates a quadratic approximation component corresponding to a change in STO resistance, and subtracts the quadratic approximation component from the STO resistance to calculate a thermal resistance change component of the STO (block 3702).

Figure 39:
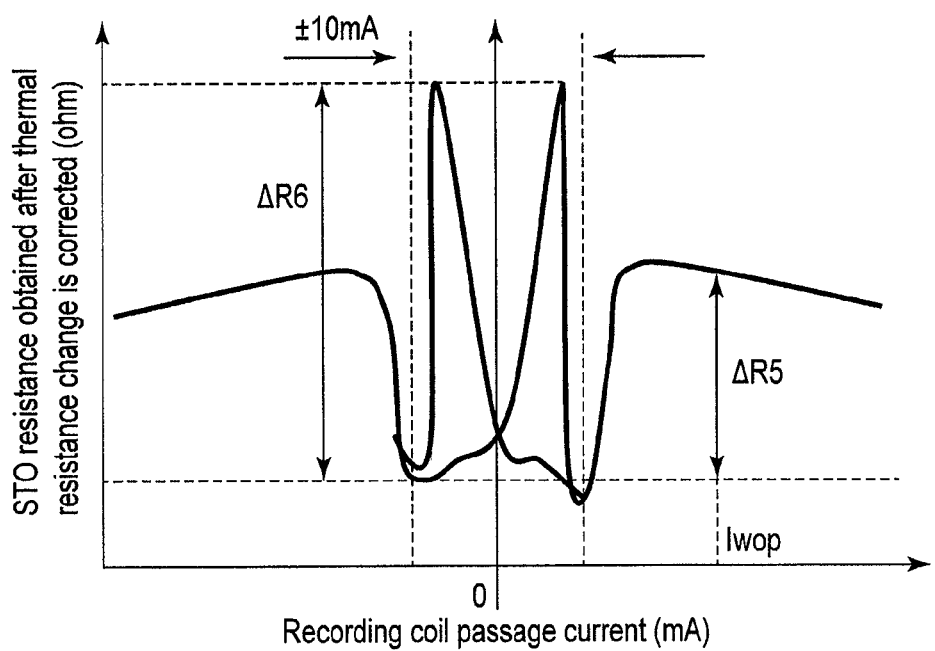
FIG. 39 is a diagram showing an example of correction of a change in STO thermal resistance based on a change in an STO resistance.

FIG. 39 shows an example of correction using the calculated thermal resistance change component of the STO. As shown in FIG. 39, the STO 22 starts to gradually oscillate around the time when the absolute value of a DC current passed through the recording coils exceeds, for example, 10 mA. In this region of the DC current, the resistance is increased by the magnetoresistive effect. The oscillation characteristics calculator 600 calculates an increase ΔR5 in resistance at a recording current Iwop for recording of data on a disk, the increase corresponding to an indicator indicative of the STO oscillation intensity. A relational expression of an oscillation intensity f is f=γ×(ΔR5) where a proportionality coefficient is denoted by γ. Furthermore, as shown in FIG. 39, the magnetizations in the STO are reversed when the polarity of a DC current passed through the recording coils is reversed, and thus the resistance is increased by the magnetoresistive effect (MR) in a low-current region of, for example, 10 mA or less. The oscillation characteristics calculator 600 calculates this increase ΔR6 in resistance caused by the magnetoresistive effect (MR) of the STO. A relational expression of the magnetoresistive effect F of the STO is F=θ×(ΔR6) where a proportionality coefficient is denoted by θ.

Referring back to FIG. 37, a time-synchronized calculator 81 subtracts the thermal resistance change component calculated by the oscillation characteristics calculator 600 from the time axis data on the resistance of the STO 22 and the time axis data on the recording coil current (block 3703). Thus, the time-synchronized calculator 81 can remove the adverse effect of thermal resistance from a time axis variation in STO resistance and thus accurately calculates the above-described STO resistance time-synchronized data (ΔR, τ, φ) (block 3704). On the other hand, the oscillation characteristics calculator 600 calculates DC current oscillation characteristics data (ΔR5, ΔR6) from which thermal resistance change component has been subtracted as described above (block 3706).

The STO normality/abnormality decision module 42 compares the latest calculation result with an initial value for time-synchronized data on the resistance stored in an STO resistance time-synchronized data saving module 82 (block 3705). The STO normality/abnormality decision module 42 checks whether or not the latest calculation result is equivalent to the initial value based on the comparison result (block 3708). The STO normality/abnormality decision module 42 also compares the latest calculation result with an initial value for the DC current oscillation characteristics data (ΔR5, ΔR6) (block 3707). The STO normality/abnormality decision module 42 checks whether or not the latest calculation result is equivalent to the initial value based on the comparison result (block 3708).

For either of the comparison results, if the latest calculation result is equivalent to the initial value, the STO normality/abnormality decision module 42 determines the STO 22 to be normal (YES in block 3708). Based on the determination result, an STO controller 43 performs current control to pass a current through the STO 22 (block 3709). Moreover, a recording coil controller 44 performs current control to supply a recording current to the coils 23 and 24 (block 3710). Hence, high-density magnetic recording is carried out on the disk 1 to apply a recording magnetic field and a high-frequency magnetic field to the disk 1.

On the other hand, if the latest calculation result deviates from the initial value, the STO normality/abnormality decision module 42 determines the STO 22 to be abnormal and malfunctioning (NO in block 3708). Specifically, as shown in FIG. 40 as a first example of determination, the STO normality/abnormality decision module 42 determines the oscillation intensity of the STO to be degraded to determine the STO to be malfunctioning if the absolute value of the latest calculation result ΔR5 is less than 50% of the initial value (4000). Furthermore, as shown in FIG. 41 as a second example of determination, the STO normality/abnormality decision module 42 determines the magnetoresistive effect of the STO to be degraded to determine the STO to be malfunctioning if the absolute value of the latest calculation result ΔR6 is less than 50% of the initial value (4100).

Referring back to FIG. 37, upon determining the STO 22 to be malfunctioning, the STO normality/abnormality decision module 42 outputs an operation off command to the STO controller 43 (block 3711) as described above. At the same time, the STO normality/abnormality decision module 42 outputs an operation off command to the recording coil controller 44 (block 3712). Moreover, the STO normality/abnormality decision module 42 outputs an operation on command to a head driver 45 and a reproduction signal detector 46 (block 3713). Thus, the reproduction signal detector 46 reproduces recorded data from the disk surface over which the head 10 is traveling, and stores the reproduced data in a memory 17 via a reproduction signal saving module 47.

Subsequently, the STO normality/abnormality decision module 62 outputs a recording operation on command to an STO controller 63 and a recording coil controller 64 in the head 50 (block 3714). Thus, the STO controller 63 performs current control to pass a current through the STO 22 in the head 50 (block 3715). Moreover, the recording coil controller 64 performs current control to supply a recording current to the coils 23 and 24 in the head 50 (block 3716). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The fifth embodiment configured as described above can also exert effects similar to the effects of the above-described first embodiment.

Sixth Embodiment

Figure 42:
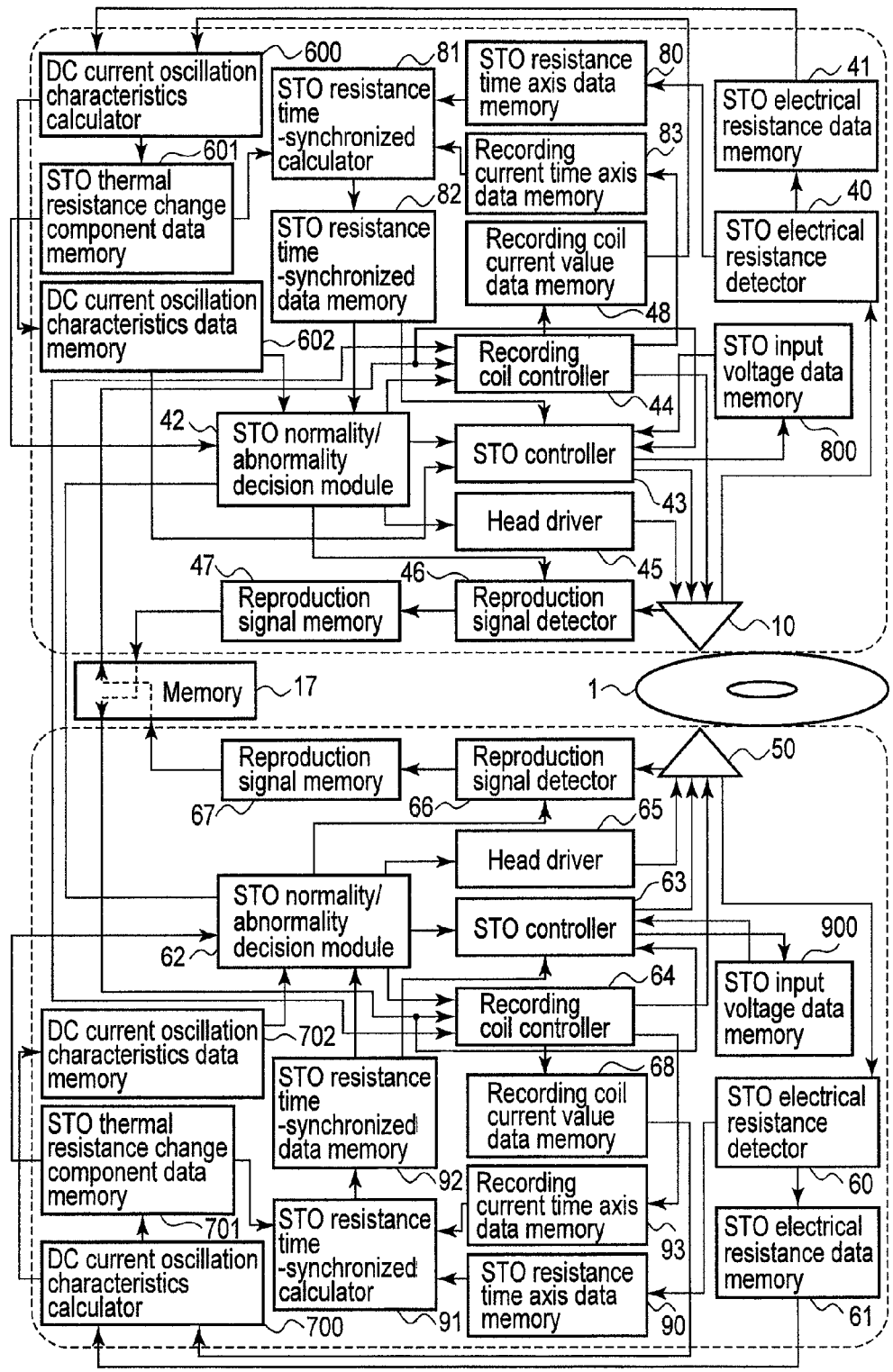
FIG. 42 is a block diagram showing a functional configuration that implements recording and reproduction control according to a sixth embodiment.

FIG. 42 is a block diagram showing a configuration that implements recording and reproduction control for a head according to a sixth embodiment. As is the case with the first embodiment, heads 10 and 50 are mounted in the same actuator 3, and the same configuration performs the recording and reproduction control on both the heads 10 and 50. However, for convenience, a configuration for carrying out the functions of the recording and reproduction control on each of the heads 10 and 50 is illustrated. Components of the sixth embodiment which are similar to the corresponding components of the fifth embodiment shown in FIG. 36 are denoted by the same reference numbers and will not be described below.

As shown FIG. 42, according to the present embodiment, STO controller 43, 63 performs current control to pass a current through the STO 22. At this time, STO input voltage data saving module (hereinafter referred to as an input voltage data saving module) 800, 900 stores STO input voltage data input by the STO controller 43, 63.

The operation of the recording and reproduction control according to the present embodiment will be described below with reference to a flowchart in FIG. 43.

As shown in FIG. 43, a resistance time axis data saving module 80 stores time axis data on the resistance of the STO 22 detected by an STO resistance detector 40 (block 4300). Furthermore, a current time-axis data saving module 83 stores time axis data on a recording coil current supplied by a recording coil controller 44.

An oscillation characteristics calculator 600 calculates a resistance change for the STO 22 based on the recording coil current data (block 4301). The oscillation characteristics calculator 600 also corrects an STO thermal resistance change component of the calculated resistance change of the STO 22 to calculate thermal resistance change component data (block 4302).

The STO controller 43 calculates a saturated STO voltage Vs at which ΔR1 and ΔR2 are saturated based on the dependence of ΔR1 and ΔR2 on the voltage of the STO (block 4303). Here, FIG. 44 shows an example of a variation in ΔR1 and ΔR2 in the STO which occurs when a voltage provided to the STO by the STO controller 43 is varied. As shown in FIG. 44, when the voltage provided to the STO increases to allow the STO to start oscillating, ΔR1 and ΔR2 rise. This is caused by the magnetoresistive effect because the magnetizations in the STO membrane are misaligned. When the voltage provided to the STO becomes sufficiently high, the STO starts to oscillate with the magnetizations therein rotating through a large angle almost within a membrane surface, and ΔR1 and ΔR2 are saturated. The saturated STO voltage in this case is denoted by Vs. Alternatively, the STO controller 43 may calculate the saturated STO voltage Vs obtained when ΔR5 is saturated based on the dependence of ΔR5 on the STO voltage (block 4303).

If the STO controller 43 controls the STO voltage within the range of Vs×0.1 or more or Vs×0.8 or less, the oscillation characteristics calculator 600 calculates DC current oscillation characteristics data (ΔR6) as described above. Furthermore, a time-synchronized calculator 81 calculates the above-described STO resistance time-synchronized data (ΔR3, ΔR4) (block 4305). Thus, even if the STO generates a high spin torque noise, a variation in STO resistance (ΔR3, ΔR4, ΔR6) caused by the magnetoresistive effect when the magnetizations in the STO are reversed can be accurately calculated. An STO normality/abnormality decision module 42 compares the latest calculation result with an initial value for the STO resistance time-synchronized data (ΔR3, ΔR4) and the DC current oscillation characteristics data (ΔR6) (block 4306). The STO normality/abnormality decision module 42 checks whether or not the latest calculation result is equivalent to the initial value based on the comparison result (block 4307).

For either of the comparison results, if the latest calculation result is equivalent to the initial value, the STO normality/abnormality decision module 42 determines the STO 22 to be normal (YES in block 4307). Based on the determination result, the STO controller 43 performs current control to pass a current through the STO 22 (block 4308). Moreover, a recording coil controller 44 performs current control to supply a recording current to coils 23 and 24 (block 4309). Hence, high-density magnetic recording is carried out on a disk 1 to apply a recording magnetic field and a high-frequency magnetic field to the disk 1.

On the other hand, if the latest calculation result deviates from the initial value, the STO normality/abnormality decision module 42 determines the STO 22 to be abnormal and malfunctioning (NO in block 4307). Upon determining the STO 22 to be malfunctioning, the STO normality/abnormality decision module 42 outputs an operation off command to the STO controller 43 (block 4310). At the same time, the STO normality/abnormality decision module 42 outputs an operation off command to the recording coil controller 44 (block 431). Moreover, the STO normality/abnormality decision module 42 outputs an operation on command to a head driver 45 and a reproduction signal detector 46 (block 4312). Thus, the reproduction signal detector 46 reproduces recorded data from the disk surface over which the head 10 is traveling, and stores the reproduced data in a memory 17 via a reproduction signal saving module 47.

Subsequently, an STO normality/abnormality decision module 62 outputs a recording operation on command to an STO controller 63 and a recording coil controller 64 in the head 50 (block 4313). Thus, the STO controller 63 performs current control to pass a current through the STO 22 in the head 50 (block 4314). Moreover, the recording coil controller 64 performs current control to supply a recording current to the coils 23 and 24 in the head 50 (block 4315). Hence, high-density magnetic recording can be carried out on the disk 1 to apply a recording magnetic field and a high-frequency magnetic field to the disk 1.

That is, the recording coil controller 64 can magnetically record data stored in the memory 17 to the disk 1 by the head 50. Namely, the data recorded on the head 10-side disk surface of the disk 1 can be moved to the head 50-side disk surface of the disk 1.

Of course, the recording and reproduction control including a damage inspection (normality/abnormality decision process) for the STO 22 in the head 10 is also applicable to the head 50. Furthermore, the damage inspection (normality/abnormality decision process) for the STO 22 may be carried out with the head 10, 50 unloaded from the disk 1. Alternatively, an STO inspection dedicated zone may be provided on the disk 1 so that the head 10, 50 can be moved to the zone, where the damage inspection (normality/abnormality decision process) for the STO 22 is carried out.

The sixth embodiment configured as described above can also exert effects similar to the effects of the above-described first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a magnetic head comprising a high-frequency oscillation element disposed close to a main magnetic pole that generates a recording magnetic field for perpendicular magnetic recording, the high-frequency oscillation element applying a high-frequency magnetic field onto a magnetic disk during data recording;
   a detector configured to detect an electrical resistance of the high-frequency oscillation element, and to detect a plurality of minimum points near reversal of polarity of a recording current for generating the recording magnetic field, which are obtained after the reversal of polarity, and a maximum point between the plurality of minimum points;
   a calculator configured to calculate time axis data indicative of a variation, on a time axis, in the electrical resistance value detected by the detector; and a decision module configured to determine whether the high-frequency oscillation element is malfunctioning based on a variation amount obtainable by comparing the prior time axis data calculated by the calculator with the latest time axis data.

2. The disk storage apparatus of claim 1, wherein
the detector is configured to detect the variation in the electrical resistance value in a first half of a period between the reversal of polarity of the recording current and next reversal of polarity, and
the calculator is configured to calculate, as the time axis data, time-synchronized data indicating state that the electrical resistance of the high-frequency assisted oscillation element varies on the time axis, in synchronism with reversal of a polarity of a recording current for generating the recording magnetic field.

3. The disk storage apparatus of claim 2, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased is R3, the detector calculates one of a first difference $\Delta R1=R3-R0$ and a second difference $\Delta R2=R3-R2$, and executes determination for malfunction of the high-frequency oscillation element based on the calculated difference.

4. The disk storage apparatus of claim 2, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detector calculates one of a first time $\tau 1=T3-T0$, a second time $\tau 2=T3-T1$ and a third time $\tau 3=T3-T2$, and executes determination for malfunction of the high-frequency oscillation element based on the calculated time.

5. The disk storage apparatus of claim 2, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detector calculates one of a first time $\phi 1=T2-T0$, a second time $\phi 2=T2-T1$ and a third time $\phi 3=T1-T0$, and executes determination for malfunction of the high-frequency oscillation element based on the calculated time.

6. The disk storage apparatus of claim 2, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased by oscillation of the high-frequency oscillation element is R3, the detector calculates one of a first resistance variation $\Delta R3=R1-R0$ and a second resistance variation $\Delta R4=R1-R2$, and executes determination for malfunction of the high-frequency oscillation element based on the calculated resistance variation.

7. The disk storage apparatus of claim 1, wherein the detector comprises:
a generator configured to generate an inspection low-frequency signal for detecting the electrical resistance of the high-frequency oscillation element; and
a low-pass filter with a cutoff frequency at least double a frequency of the inspection low-frequency signal.

8. The disk storage apparatus of claim 1, wherein the detector comprises a filter with a passband close to a frequency of a recording signal for generating the recording magnetic field, and
the decision module is configured to determine whether the high-frequency oscillation element is malfunctioning based on oscillation response characteristics data, as the time axis data, on the high-frequency oscillation element.

9. The disk storage apparatus of claim 1, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased is R3, the detector calculates one of a first difference $\Delta R1=R3-R0$ and a second difference $\Delta R2=R3-R2$, and executes determination for malfunction of the high-frequency oscillation element based on the calculated difference.

10. The disk storage apparatus of claim 1, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detector calculates one of a first time $\tau 1=T3-T0$, a second time $\tau 2=T3-T1$ and a third time $\tau 3=T3-T2$, and executes determination for malfunction of the high-frequency oscillation element based on the calculated time.

11. The disk storage apparatus of claim 1, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detector calculates one of a first time $\phi 1=T2-T0$, a second time $\phi 2=T2-T1$ and a third time $\phi 3=T1-T0$, and executes determination for malfunction of the high-frequency oscillation element based on the calculated time.

12. The disk storage apparatus of claim 1, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased by oscillation of the high-frequency oscillation element is R3, the detector calculates one of a first resistance variation $\Delta R3=R1-R0$ and a second resistance variation $\Delta R4=R1-R2$, and executes determination for malfunction of the high-frequency oscillation element based on the calculated resistance variation.

13. A method of determining malfunction of a disk storage apparatus comprising a magnetic head having a high-frequency oscillation element, the high-frequency oscillation element being disposed close to a main magnetic pole that generates a recording magnetic field for perpendicular magnetic recording, the high-frequency oscillation element applying a high-frequency magnetic field onto a magnetic disk during data recording, the method comprising:
detecting an electrical resistance of the high-frequency oscillation element, the detecting including detecting a plurality of minimum points near reversal of polarity of a recording current for generating the recording magnetic field, which are obtained after the reversal of polarity, and a maximum point between the plurality of minimum points;
calculating time axis data indicative of a variation, on a time axis, in the detected electrical resistance value; and
determining whether the high-frequency oscillation element is malfunctioning based on a variation amount obtainable by comparing the calculated prior time axis data with the latest time axis data.

14. The method of claim 13, wherein
the detecting includes detecting a variation in the electrical resistance value in a first half of a period between the reversal of polarity of the recording current and next reversal of polarity, and
the calculating includes calculating, as the time axis data, time-synchronized data indicating state that the electrical resistance of the high-frequency oscillation element varies on the time axis, in synchronism with reversal of a polarity of a recording current for generating the recording magnetic field.

15. The method of claim 13, wherein the detecting includes:
generating an inspection low-frequency signal for detecting the electrical resistance of the high-frequency oscillation element; and
low-pass filtering with a cutoff frequency at least double a frequency of the inspection low-frequency signal.

16. The method of claim 13, wherein the detecting includes filtering with a passband close to a frequency of a recording signal for generating the recording magnetic field, and
the determining includes determining whether the high-frequency oscillation element is malfunctioning based on oscillation response characteristics data, as the time axis data, on the high-frequency oscillation element.

17. The method of claim 13, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased is R3, the detecting includes calculating one of a first difference $\Delta R1=R3-R0$ and a second difference $\Delta R2=R3-R2$, and executing determination for malfunction of the high-frequency oscillation element based on the calculated difference.

18. The disk storage apparatus of claim 13, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detecting includes calculating one of a first time $\tau 1=T3-T0$, a second time $\tau 2=T3-T1$ and a third time $\tau 3=T3-T2$, and executing determination for malfunction of the high-frequency oscillation element based on the calculated time.

19. The method of claim 13, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, the electrical resistance value which is subsequently increased is R3, a time when the electrical resistance becomes R0 is T0, a time when the electrical resistance becomes R1 is T1, a time when the electrical resistance becomes R2 is T2, and a time when the electrical resistance becomes R3 is T3, the detecting includes calculating one of a first time $\phi 1=T2-T0$, a second time $\phi 2=T2-T1$ and a third time $\phi 3=T1-T0$, and executing determination for malfunction of the high-frequency oscillation element based on the calculated time.

20. The method of claim 13, wherein
when the electrical resistance value which becomes minimum in accordance with the reversal of polarity of the recording signal is R0, the electrical resistance value which subsequently becomes maximum is R1, the electrical resistance value which subsequently becomes minimum again is R2, and the electrical resistance value which is subsequently increased by oscillation of the high-frequency oscillation element is R3, the detecting includes calculating one of a first resistance variation $\Delta R3=R1-R0$ and a second resistance variation $\Delta R4=R1-R2$, and executing determination for malfunction of the high-frequency oscillation element based on the calculated resistance variation.

\* \* \* \* \*